United States Patent
Himeda et al.

(10) Patent No.: US 7,967,512 B2
(45) Date of Patent: Jun. 28, 2011

(54) ROLLING BEARING UNIT FOR ROTATION SUPPORT UNIT

(75) Inventors: Daisuke Himeda, Kanagawa (JP); Takao Katougi, Kanagawa (JP); Tomoharu Sugiman, Kanagawa (JP); Toshiharu Honda, Kanagawa (JP); Juji Harada, Kanagawa (JP); Seigou Urakami, Kanagawa (JP); Takashi Kato, Kanagawa (JP)

(73) Assignee: NSK Ltd., Tokyo (JP)

( * ) Notice: Subject to any disclaimer, the term of this patent is extended or adjusted under 35 U.S.C. 154(b) by 469 days.

(21) Appl. No.: 12/144,126

(22) Filed: Jun. 23, 2008

(65) Prior Publication Data

US 2009/0052826 A1 Feb. 26, 2009

(30) Foreign Application Priority Data

Jun. 22, 2007 (JP) .................................. 2007-164581
Nov. 13, 2007 (JP) .................................. 2007-294624

(51) Int. Cl.
*F16C 43/00* (2006.01)
(52) U.S. Cl. ....................................... 384/539; 384/903
(58) Field of Classification Search .................. 384/539, 384/903, 537
See application file for complete search history.

(56) References Cited

U.S. PATENT DOCUMENTS

| 2,277,635 | A | * | 3/1942 | Delaval-Crow | 384/542 |
| 2,607,642 | A | * | 8/1952 | Gilbert | 384/539 |
| 3,888,597 | A | * | 6/1975 | Datta | 384/539 |
| 4,511,191 | A | * | 4/1985 | Kitamura | 384/536 |

FOREIGN PATENT DOCUMENTS

| DE | 2658157 A1 | 6/1978 |
| DE | 200 19 278 U1 | 5/2001 |
| DE | 10 2005 012 323 B3 | 6/2006 |
| JP | 2005-220990 A | 8/2005 |
| JP | 2007-504412 A | 3/2007 |

OTHER PUBLICATIONS

Extended European Search Report dated Oct. 16, 2008.

* cited by examiner

*Primary Examiner* — Thomas R Hannon
(74) *Attorney, Agent, or Firm* — Sughrue Mion, PLLC

(57) ABSTRACT

A retainer plate 7a is fitted on a smaller-diameter step portion 9a of an outer ring 5a, and a retaining ring 11 fitted on the smaller-diameter step portion 9a is engaged with retaining projections 15 formed on an inner circumferential surface of a fitting hole 12 formed through the retainer plate 7a, thereby preventing the retainer plate 7a from falling-off from the smaller-diameter step portion 9a. The structures and shapes of the various portions are so determined that working or machining can be easily effected to form these portions so as to overcome a problem encountered with the conventional structure.

17 Claims, 27 Drawing Sheets

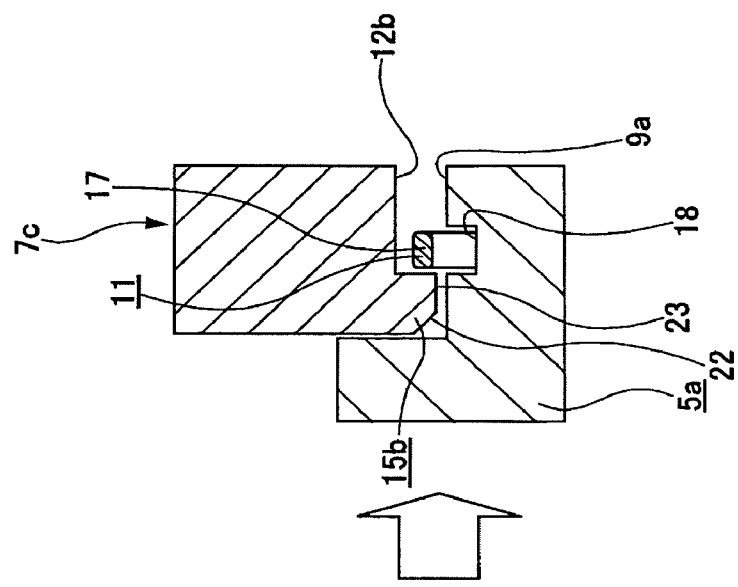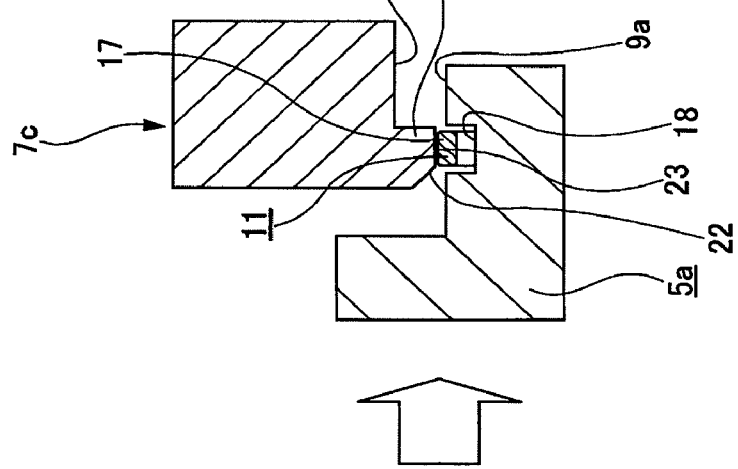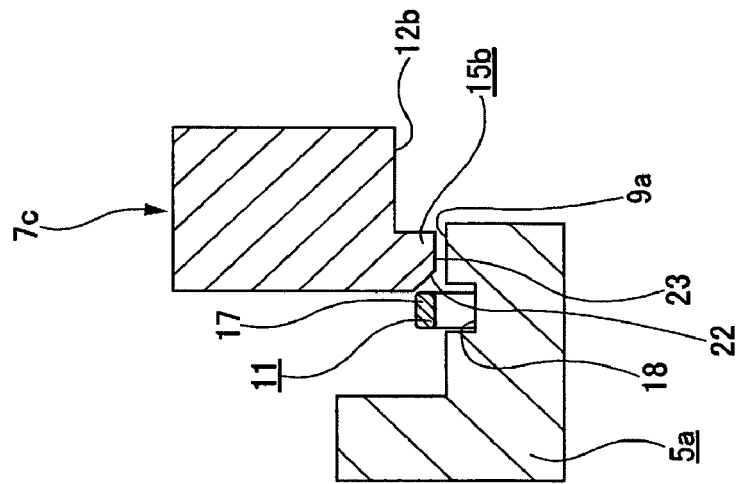

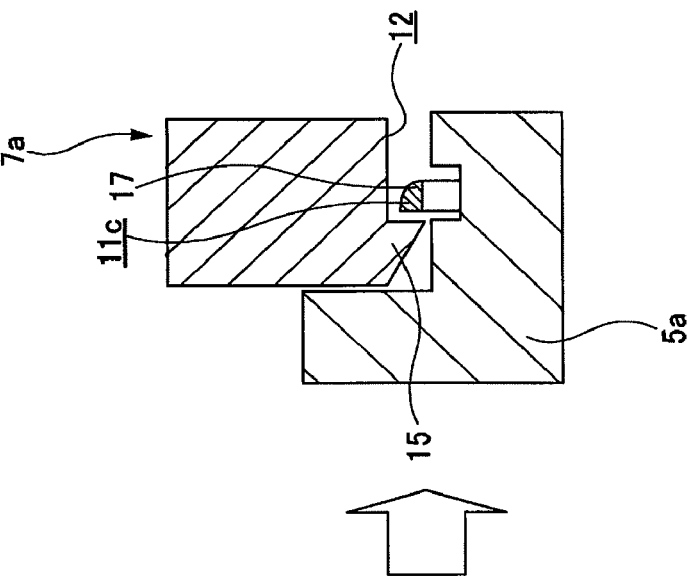
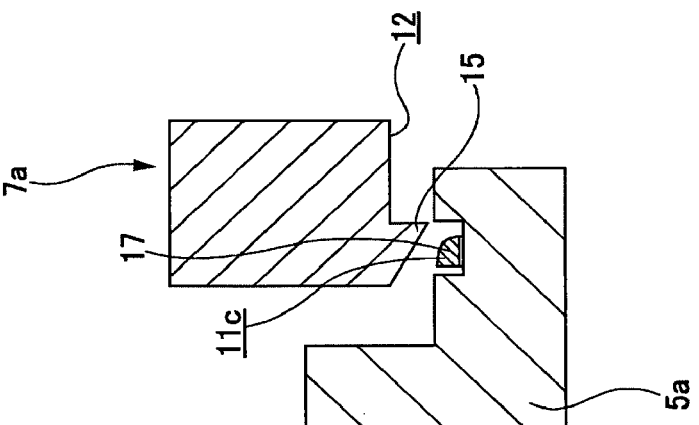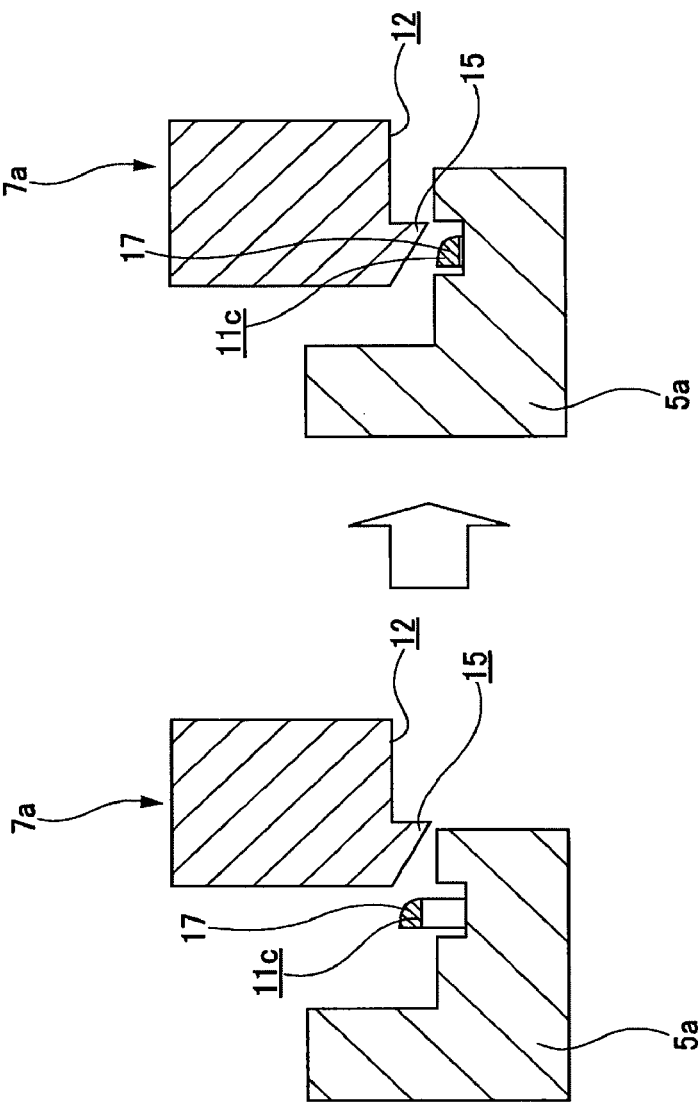

ROLLING BEARING UNIT FOR ROTATION SUPPORT UNIT

BACKGROUND OF THE INVENTION

1. Field of the Invention

This invention relates to an improved rolling bearing unit which is a part of a rotation support unit (for example, a manual transmission or an automatic transmission of an automobile transmission) for supporting an end portion of a rotation shaft on an inner surface of a housing containing component parts of the automobile transmission.

2. Description of the Related Art

As shown in FIG. 30, an end portion of a rotation shaft 1 such as a counter shaft of an automobile transmission is rotatably supported on an inner surface of a housing 2 accommodating components such as the rotation shaft 1, a gear, etc., through a rolling bearing 3 such as a ball bearing. In this case, an annular or circular holding recess 4 is formed in the inner surface of the housing 2, and an outer ring 5 of the rolling bearing 3 is fitted in the holding recess 4 to be inwardly fixed thereto in an interference manner. The end portion of the rotation shaft 1 is inwardly fitted in the interference manner or the like in an inner ring 6 of the rolling bearing 3 against radial movement. Further, in order to prevent the outer ring 5 from falling off the holding recess 4, the outer ring 5 is held against one axial end face of the holding recess 4 by a retainer plate 7.

Here, the left side in FIGS. 1, 3, 4, 30 and etc., is defined as one axial end, while the right side is defined as the other axial end.

As known, for example, from DE 20019278U1, DE 102005012323B3, JP-T-2007-504412, etc., the rolling bearing 3 and the retainer plate 7 are coupled together to form a bearing unit 8 as shown in FIGS. 31 and 32 so that this bearing unit 8 can be easily mounted in the holding recess 4. In this bearing unit 8; the retainer plate 7 is fitted on a smaller-diameter step portion 9 formed on an outer circumferential surface of the other axial end portion of the outer ring 5 of the rolling bearing 3, and can rotate relative to this outer ring 5.

The rolling bearing unit 8 is mounted within the housing 2 with the outer ring 5 fitted in an interference manner in the holding recess 4 and also with one side face of the retainer plate 7 held against an inner surface of the housing 2. Then, by rotating the retainer plate 7 relative to the outer ring 5, through holes 10 formed through an outer circumferential portion of the retainer plate 7 are brought into alignment respectively with screw holes (not shown) formed in the inner surface of the housing 2. Then, screws are passed through the respective through holes 10, and are threaded into the respective screw holes, and are further tightened. In another structure, instead of the through holes 10, screw holes are formed in the outer circumferential portion of the retainer plate 7, and screws are passed from the exterior through respective through holes formed in the housing 2, and are threaded into the respective screw holes, and are further tightened.

In this structure in which the screw holes are formed in the retainer plate 7, heads of the screws are prevented from projecting into the housing from the retainer plate, and a space within the housing can be efficiently utilized. In either structure, the outer ring 5 is fixedly supported in the holding recess 4 without rattling and also without falling-off from this holding recess 4.

In such a bearing unit 8, the retainer plate 7 is rotatably connected to the outer ring 5, and is prevented from separation from the outer ring 5. The retainer plate 7 is thus rotatable relative to the outer ring 5 so that the through holes 10 and the screw holes can be brought into alignment with each other after the outer ring 5 is fitted in the holding recess 4 in an interference manner or the like against radial movement. Also, the retainer plate 7 is thus not separated from the outer ring 5 so that the rolling bearing 3 and the retainer plate 7 can be handled as a single unit so as to facilitate the management of the parts, an assembling operation, etc.

For these reasons, the outer ring 5 and the retainer plate 7 are connected together so as to rotate relative to each other but can not be separated from each other. Therefore in the structure described in DE20019278U1, a plurality of projections formed on an inner circumferential edge of the retainer plate are engaged in a circumferential recess formed in an outer circumferential surface of the smaller-diameter step portion. In the structure described in DE102005012323B3, the side face of the retainer plate is held by a leaf spring held on an outer circumferential surface of the smaller-diameter step portion. Further, in the structure described in JP-T-2007-504412, an inner circumferential edge of the retainer plate is plastically deformed, and is engaged in a circumferential recess formed in an outer circumferential surface of the smaller-diameter step portion.

In the structure described in DE20019278U1, when a strength of connection between the outer ring 5 and the retainer plate 7 is increased, an operation for engaging the projections in the circumferential recess becomes difficult. Particularly, when the thickness and resiliency of this retainer plate 7 are increased so that the retainer plate 7 can retain the outer ring 5 in the holding recess 4 with a large force, the above difficulty becomes conspicuous. In the, structure described in DE 102005012323B3, although such a disadvantage is not encountered, the cost is inevitably increased since the leaf spring complicated in shape and requiring cumbersome processing or working is used. Further, in the structure described in JP-T-2007-504412, a pressing machine for plastically deforming the retainer plate is required, and therefore the cost is increased.

SUMMARY OF THE INVENTION

This invention has been made in view of the above circumstances, and an object of the invention is to provide a rotation support unit and a rolling bearing unit for a rotation support unit, in which a structure of combination of an outer ring of a rolling bearing and a retainer plate for retaining the outer ring in a holding recess can be easily obtained at a low cost.

In order to achieving the above object, according to a 1st aspect of the present invention, there is provided a rolling bearing unit for rotatably supporting a rotation shaft on a housing, including:

a radial bearing including an outer ring, the outer ring including:
- a larger-diameter outer circumferential surface formed on one axial end portion thereof;
- a smaller-diameter step portion formed at the other axial end portion thereof and having a retaining recessed groove formed therein and
- a step surface formed between the larger-diameter outer circumferential surface and the smaller diameter step portion;

a retainer plate having a fitting hole formed through a central portion thereof, to which the smaller-diameter step portion is outwardly fitted, and a retaining projection formed on an inner circumferential surface of the fitting hole and a retaining ring of an interrupted ring-shape which is made of a resilient material, and includes a smaller-diameter portion received in the retaining recessed groove in the outer ring, and a larger-diameter retaining portion projecting radially outwardly from an outer circumferential surface of the smaller-diameter step portion of the outer ring;

wherein the retainer plate is disposed between the step surface of the outer ring and the larger-diameter retaining portion of the retaining ring so as to rotate relative to the smaller-diameter step portion of the outer ring and so as to prevent the retainer plate from falling off therefrom to the other axial end side.

According to a 2nd aspect of the invention, in the rolling bearing unit of the 1st aspect, it is advantageous that a recess portion is formed at the other axial end side of the retaining projection of the retaining plate, and is recessed from the inner circumferential surface of the retainer plate; and the larger-diameter retaining portion of the retaining ring is received in the recess portion.

According to a 3rd aspect of the invention, in the rolling bearing unit of the 2nd aspect, it is advantageous that The rolling bearing unit according to claim 2, wherein an inner diameter of the inner circumferential surface of the retainer plate is larger than a diameter of the smaller-diameter step portion of the outer ring; and a plurality of the recess portions are formed in the inner circumferential surface of the retainer plate and are spaced from one another in a circumferential direction; and a plurality of the retaining projections of the retainer plate are provided at the one axial ends, respectively, and have inclined surface in which an inner diameter of an inner circumferential surface of the retaining projection gradually increases toward the one axial end side.

According to 4th and 5th aspects of the invention, in the rolling bearing unit of the 2nd and 3rd aspects, it is advantageous that the retainer plate has through holes or screw holes formed in at least three portions thereof spaced from one another in a circumferential direction, an outer diameter of those portions of the retainer plate having the respective through holes or screw holes is larger than those portions of the retainer plate where the through hole or screw hole is not formed, a number of the recess portions in the retainer plate is equal to a number of the through holes or screw holes and a circumferential position of each of the recess portions is located between a position (preferably intermediate position) at which a distance between the inner circumferential surface of the fitting hole and an outer circumferential edge of the retainer plate is the shortest and a portion where the through hole or screw hole is formed.

In order to stabilize the support of the retainer plate on the housing, it is preferable that the through hole or screw hole at more than three portions. However, it is acceptable to provide the through hole or the screw hole at at least two portions.

According to a 6th aspect of the invention, in the rolling bearing unit of the above 1st aspect, it is advantageous that the retaining projection is formed at one axial end of the inner circumferential surface of the retainer plate over the entire periphery thereof; and the retaining projection projects radially inwardly of the inner circumferential surface of the fitting hole.

According to a 7th aspect of the invention, in the rolling bearing unit of the above 5th aspect, it is advantageous that the retaining projection is formed at one axial end of the inner circumferential surface of the retainer plate over the entire periphery thereof; and a support projection is formed at the other axial end of the inner circumferential surface of the retainer plate over the entire periphery thereof; and a outer-diameter retaining recessed groove which retains the larger-diameter retaining portion of the retaining ring is formed between the retaining projection and the support projection; and the support projection of the retainer plate opposes to the other axial end portion of the smaller-diameter step portion of the outer ring.

According to 8th and 9th aspects of the invention, in the rolling bearing unit of the above 5th and 6th aspects, it is advantageous that an inclined surface, of which inner diameter gradually increases toward the one axial end, is formed on one axial end portion of the inner circumferential surface of the retainer plate, a cylindrical surface, which extends axially and of which inner diameter is constant, is formed on the other axial end side of the retainer plate relative to the inclined surface of the retainer plate and the cylindrical surface of the retainer plate opposes to the other end portion of the smaller-diameter step portion of the outer ring.

According to a 10th aspect of the invention, in the rolling bearing unit of the above 3rd aspect, it is advantageous that the inner circumferential surfaces of the recess portions of the retainer plate are concentric with the inner circumferential surface of the fitting hole, and are larger in diameter than the inner circumferential surface of the fitting hole.

Although it is preferable that a center of curvature of the bottom surface is preferably concentric with a center of the curvature of the fitting hole, it is not necessary to be concentric therewith (the inner circumferential surface is not necessarily concentric with the bottom surface).

According to an 11th aspect of the invention, in the rolling bearing unit of the above 3rd aspect, it is advantageous that the inner surface of the recess portion of the retainer plate is a flat surface and the distance between a central portion of the flat surface of the recess portion and the retaining recessed groove of the outer ring is smaller than the distance between each of opposite end portions of the flat surface of the recess portion and the retaining recessed groove of the outer ring.

According to 12th and 13th aspects of the invention, in the rolling bearing unit of the above 3rd; and 4th aspects, it is advantageous that when a distance between a bottom surface of the recess portion of the retainer plate and the inner circumferential surface of the retainer plate is defined as a depth, in the bottom surface of the recess portion of the retainer plate, the depth at one circumferential end portion is smaller than that at the other circumferential end portion.

According to 14th to 17th aspects of the invention, in the rolling bearing unit of the above 3rd, 4th, 8th and 9th aspects, it is advantageous that a projection amount of the larger-diameter retaining portion of the retaining ring at one circumferential end portion larger than that at the other circumferential end portion.

According to the above 3rd to 17th aspects, preferably, the fitting holes has three or more recess portions, and also the retaining ring has three or more larger-diameter retaining portions, and the recess portions and the larger-diameter retaining portions are equal in number to each other, and are provided at the same pitch. The amount of radially-outwardly projection of the larger-diameter retaining portion formed at a circumferentially-intermediate portion of the retaining ring remote from an interrupted portion thereof is smaller than the amount of projection of the other larger-diameter retaining portions disposed near to the interrupted portion.

In the rolling bearing unit for the rotation support unit according to the invention, preferably, the retaining ring may have a bullet-shaped cross-section. In this case, a face of the retaining ring at the one axial end side is a flat surface disposed perpendicular to the center axis of the retaining ring, and the other axial end side face; of the retaining ring is formed into an inclined surface which is sharpened at the one axial end side, that is, gradually decreasing in outer diameter toward a distal end thereof.

Alternatively, the cross-sectional shape of the retaining ring: may be such that the outer circumferential surface of the retaining ring has a convex arc-shaped cross-section, and the retaining ring has a substantially triangular cross-section.

With the above construction of the rolling bearing unit of the invention for the rotation support unit, the structure of combination of the outer ring of the rolling bearing and the retainer plate for retaining the outer ring in the holding recess can be easily obtained within low cost.

Namely, the retaining ring for connecting the outer ring and the retainer plate together can be easily formed by bending a resilient metal wire or by injection molding a synthetic resin. In addition, the retaining recessed groove for retaining the retaining ring can be easily formed in the outer circumferential surface of the smaller-diameter step portion of the outer ring by a simple lathe turning operation. Furthermore, the recess portions and the retaining projections can be easily formed at the inner circumferential surface of the fitting hole of the retainer plate by press working. Therefore, the above structure can be easily obtained at the low cost as described above.

BRIEF DESCRIPTION OF THE DRAWINGS

FIGS. 14A to 14C are views similar to FIG. 4, but showing a third embodiment of the invention and sequentially showing the steps of connecting a retainer plate to an outer ring;

FIGS. 20A to 20C are views sequentially showing the steps of connecting a retainer plate to an outer ring in the seventh embodiment;

FIGS. 21B and 21C are views similar to FIG. 21 A, FIG. 21B showing the retaining portion as disposed at one end of the recess portion, while FIG. 21C shows the retaining portion as disposed at the other end of the recess portion;

DETAILED DESCRIPTION OF THE PREFERRED EMBODIMENTS

First Embodiment

Figure 30:
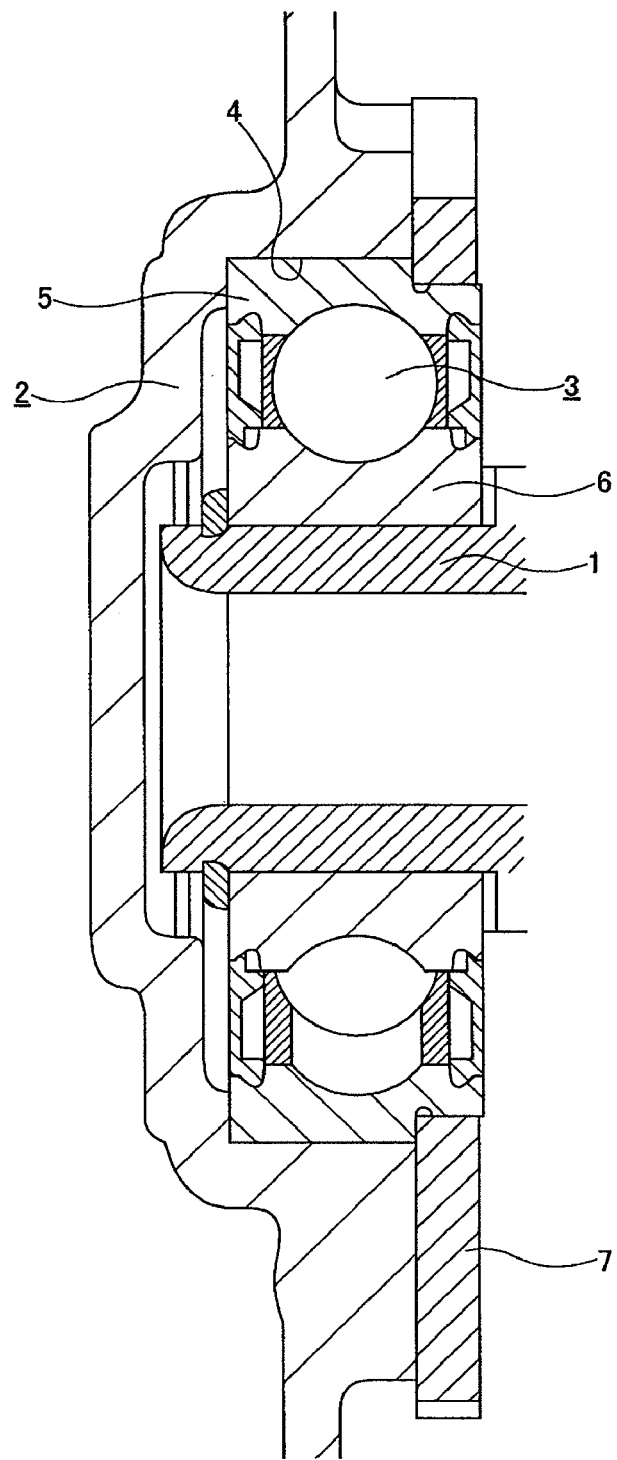
FIG. 30 is a cross-sectional view of a portion of a rotation support unit to which the present invention is directed.
Figure 31:
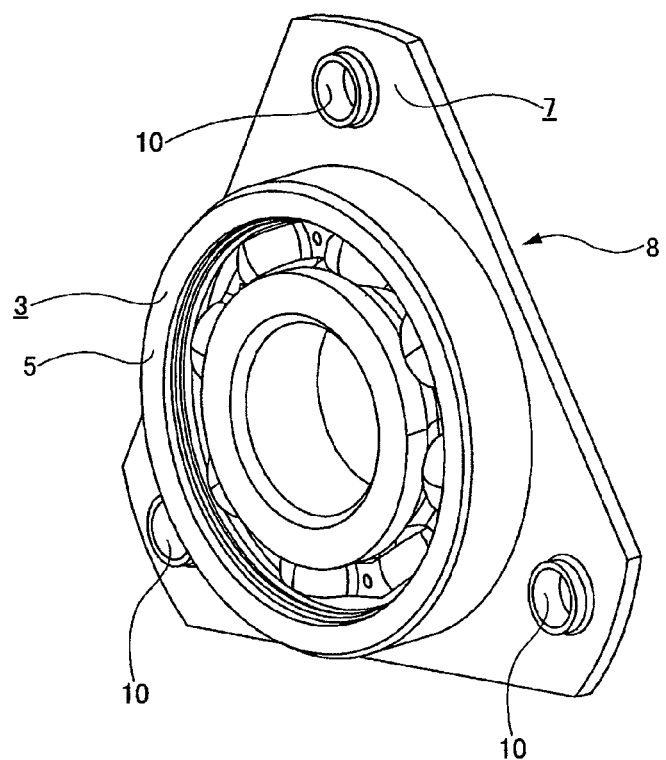
FIG. 31 is a perspective view of a conventional rolling bearing unit to be incorporated in the rotation support unit of FIG. 30
Figure 32:
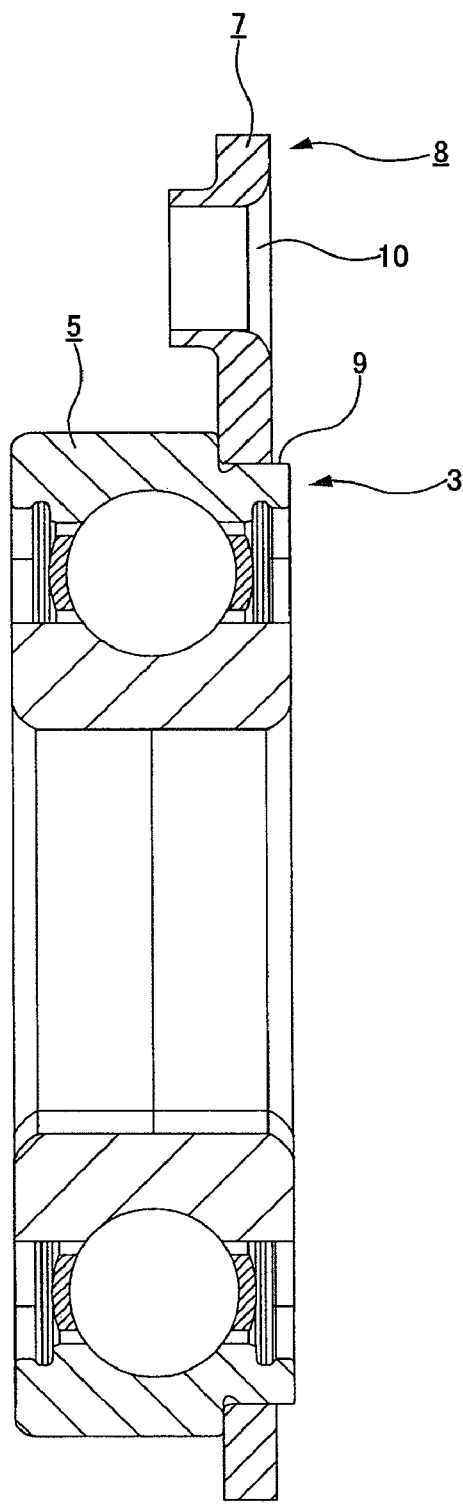
FIG. 32 is a cross-sectional view of the above conventional rolling bearing unit.

FIGS. 1 to 12 shows a first embodiment of the present invention. As shown in FIGS. 1 to 4, the rolling bearing unit 8a of this embodiment includes a retainer plate 7a which is connected to an outer ring 5a of a rolling bearing 3a through a retaining ring 11 in such a manner that the retainer plate 7a can rotate relative to the outer ring 5a but can not be separated therefrom. This rolling bearing unit 8a is used to rotatably support an end portion of the rotation shaft 1 on the inner surface of the housing 2 of an automatic transmission as shown in FIG. 30. The rolling bearing unit 8a is mounted between the housing 2 and the rotation shaft 1 in the same manner as described above for the conventional structure of FIG. 30, and the basic structure and operation of the rolling bearing 3a are the same as those of a single row deep groove ball bearing, and therefore description thereof will be omitted or given briefly, and the structure of the connecting portion between the outer ring 5a and the retainer plate 7a will be mainly described.

A smaller-diameter step portion 9a is formed on other axial side outer circumferential surface of the outer ring 5a at a portion which projects from the retaining recess 4 in a state that the outer ring 5a is inwardly fitted to the retaining recess 4 of the housing 2 (FIG. 30). The retainer plate 7a is outwardly fitted and supported on the smaller-diameter step portion 9a in such a manner that the retainer plate 7a can be rotated relative to the smaller-diameter step portion 9a and is prevented from falling off the smaller-diameter step portion 9a. The retainer plate 7a is formed by applying press working such as stamping, pressing, burring, etc., to a sheet of metal such as stainless steel. The retainer plate 7a includes a fitting hole 12, to which the smaller-diameter step portion 9a is outwardly fitted, formed through a central portion thereof, and three through holes or screw holes 10a formed through an outer circumferential portion thereof and disposed at equal intervals in a circumferential direction.

In the illustrated embodiment, cylindrical portions 14 are formed on portions surrounding the through holes or screw holes 10a. These cylindrical portion 14 are fitted to a positioning holes which are formed on opening portion of the screw holes or through holes formed in the inner surface of the housing 2 and which is larger in diameter than the screw holes or the through holes, when the retainer plate 7a is abutted to the inner surface of the housing 2. Thus, the position of the retainer plate 7a in the rotational direction can beset. When the element 10a is the screw hole, each cylindrical portion 14 also secures the axial dimension of this screw hole 10a and therefore serves to secure the strength and rigidity of the screw portion. However, when the element 10a is the through hole, the provision of the cylindrical portions 14 may be omitted.

In this embodiment, in a state that the above described retainer plate 7a is outwardly fitted to the smaller-diameter step portion 9a of the outer ring 5a, the retaining ring 11 outwardly fitted to the smaller-diameter step portion 9a is engaged with retaining projections 15 which is formed on plurality of portions (in the illustrated embodiment, three in circumferential direction with equal intervals) on inner circumferential surface of the fitting hole 12 formed on a center of the retainer plate 7a. According to this engagement, the retainer plate 7a is prevented from falling off the smaller-diameter step portion 9a.

Figure 5:
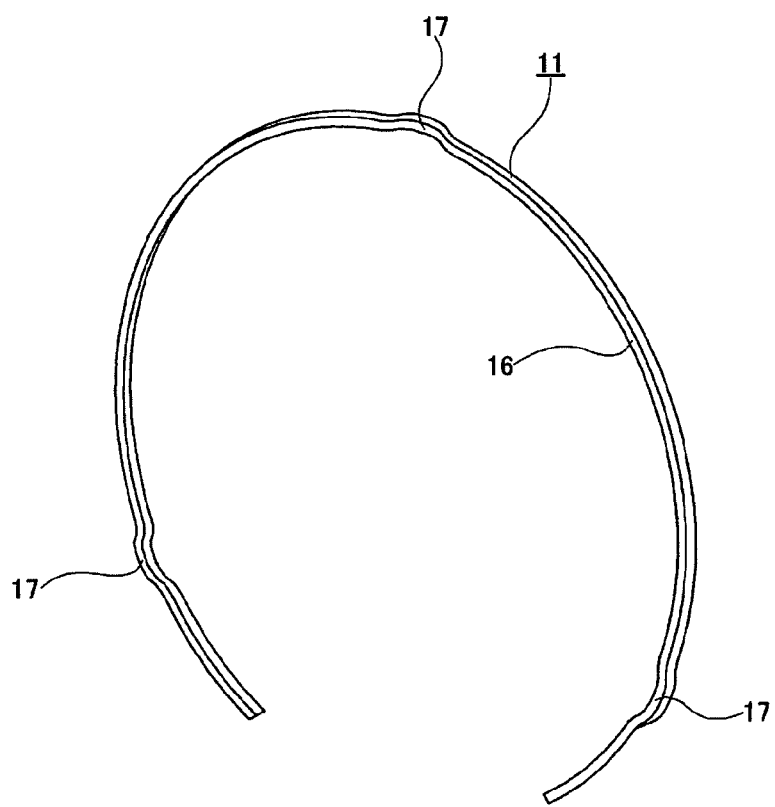
FIG. 5 is a perspective view of a retaining ring.
Figure 6:
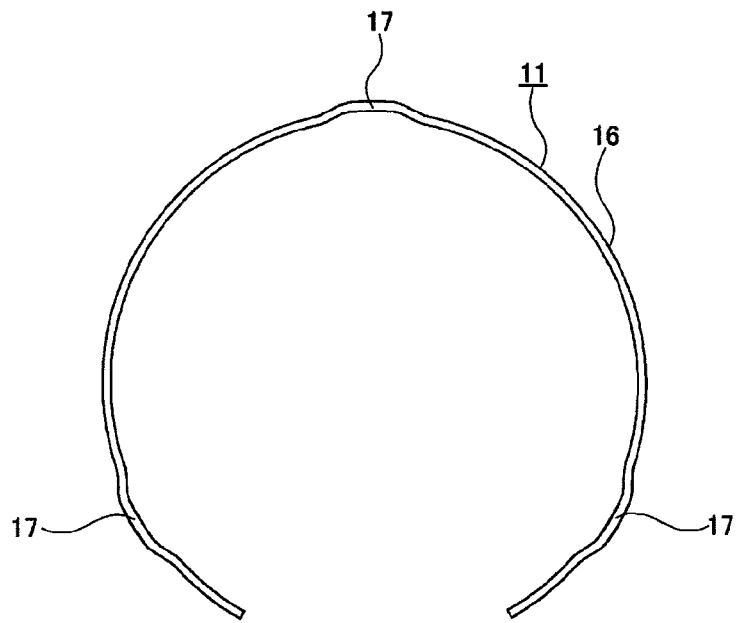
FIG. 6 is an orthographical projection view of the retaining ring as seen from an axial direction.

The retaining ring 11, which is formed by bending a resilient metal wire or by injection molding a high-functional synthetic resin, has an interrupted ring-shape as a whole as shown in FIGS. 5 and 6, and can be elastically expanded and contracted in diameter. This retaining ring 11 includes a smaller-diameter portion 16 serving as a base portion, and a plurality of (in the illustrated embodiment, three in the circumferential direction with equal intervals) larger-diameter retaining portions 17 formed respectively at those portions of the smaller-diameter portion 16 disposed at substantially equal intervals in the circumferential direction and bent or bulged radially outwardly. Each larger-diameter retaining portions 17 has a partially arc-shape larger in curvature than the smaller-diameter portion 16, and projects radially outwardly from the outer periphery of the smaller-diameter portion 16.

A retaining recessed groove 18 of a channel-shaped cross-section for retaining the retaining ring 11 is formed in an axially-intermediate portion of the outer circumferential surface of the smaller-diameter step portion 9a over the entire periphery thereof as shown in FIGS. 1, 3, 4 and 10 to 12. The retaining recessed groove 18 has such a size (volume) that the smaller-diameter portion 16 of the retaining ring 11, when received in the retaining recessed groove 18, will not project radially outwardly from the outer circumferential surface of the smaller-diameter step portion 9a. Namely, a depth $d_{18}$ and a width $w_{18}$ of the retaining recessed groove 18 are equal to or slightly larger than a height $h_{11}$ and a width $w_{11}$ of a cross-section of the retaining ring 11, respectively ($d_{18} \geq h_{11}$, $w_{18} \geq w_{11}$) (see FIG. 4). However, a height $h_{17}$ (see FIG. 11) of each larger-diameter retaining portion 17 in its free condition is larger than the depth $d_{18}$ of the retaining recessed groove 11 ($h_{17} > d_{18}$).

Figure 7:
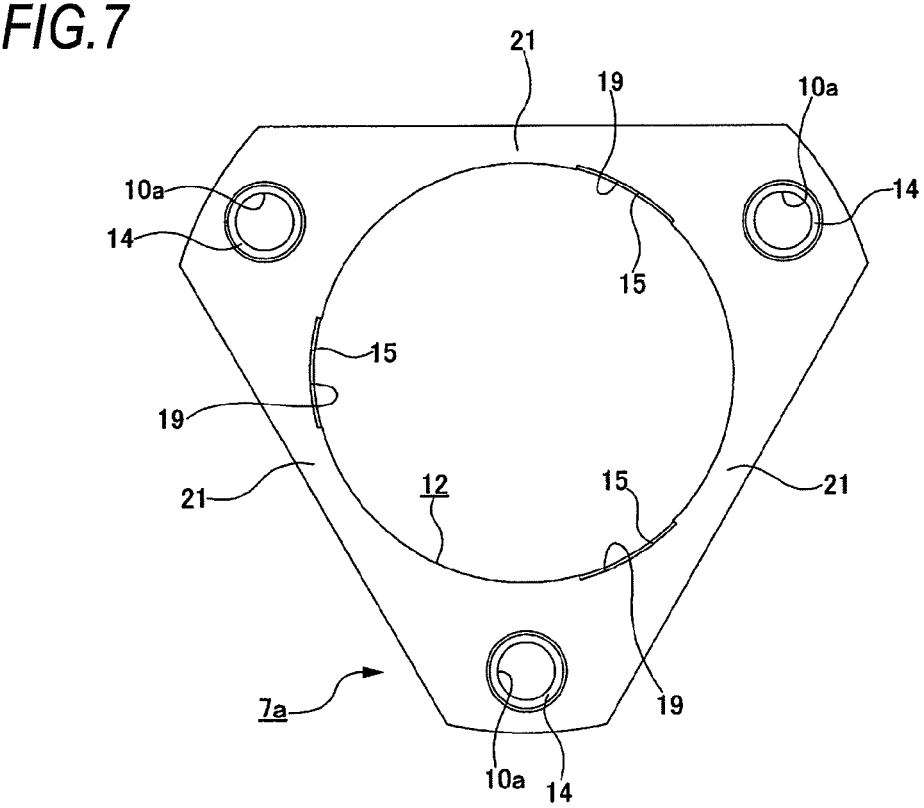
FIG. 7 is a view of a removed retainer plate as seen from the left side of FIG. 1.
Figure 8:
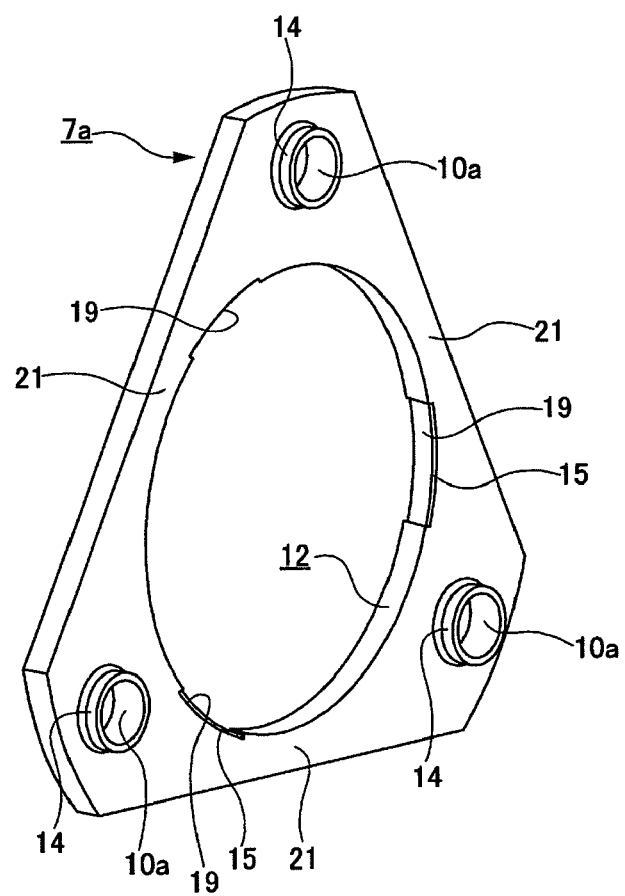
FIG. 8 is a perspective view of the retainer plate.

On the other hand, as shown in FIGS. 7 and 8, the fitting hole 12 formed through the central portion of the retainer plate 7a is circular except a plurality of larger-diameter portions 19 (described later), and has such an inner diameter that the inner circumferential surface of the fitting hole 12 is loosely fitted on the smaller-diameter step portion 9a of the outer ring 5a while having a clearance therebetween. The larger-diameter portions (recess portions) 19 are formed respectively in a plurality of (three in the illustrated embodiment) portions of the inner circumferential surface of the fitting hole 12 disposed at equal intervals in the circumferential direction, and are recessed radially outwardly from the inner periphery of the fitting hole 12.

Figure 4:
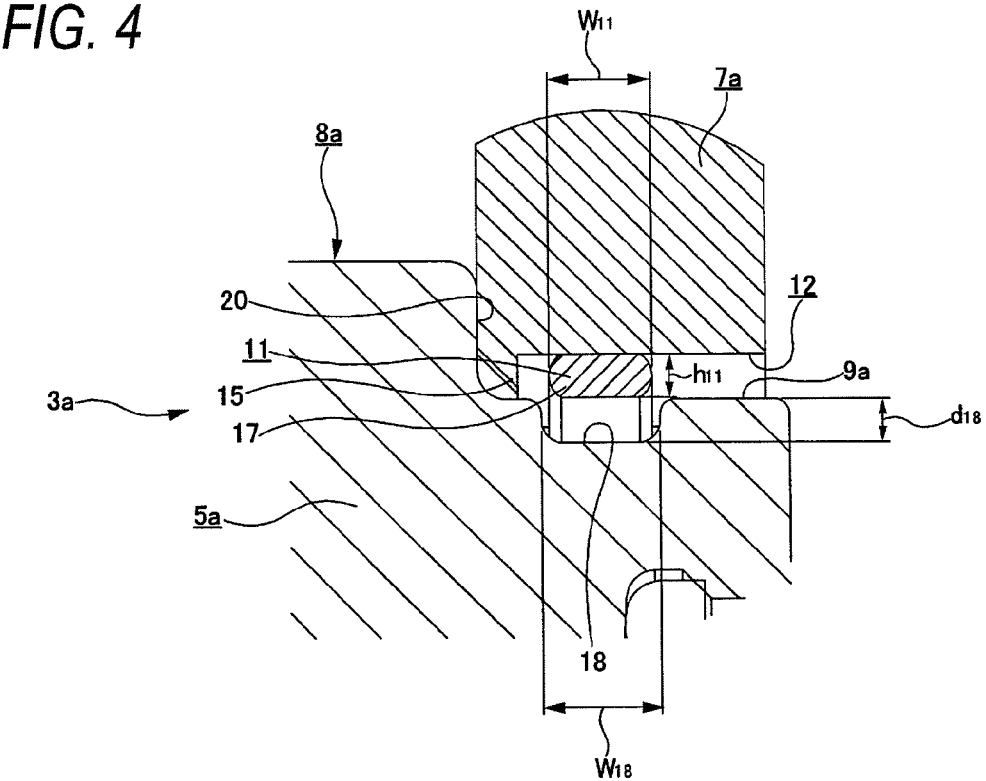
FIG. 4 is an enlarged view of a right upper portion of FIG. 3.
Figure 9:
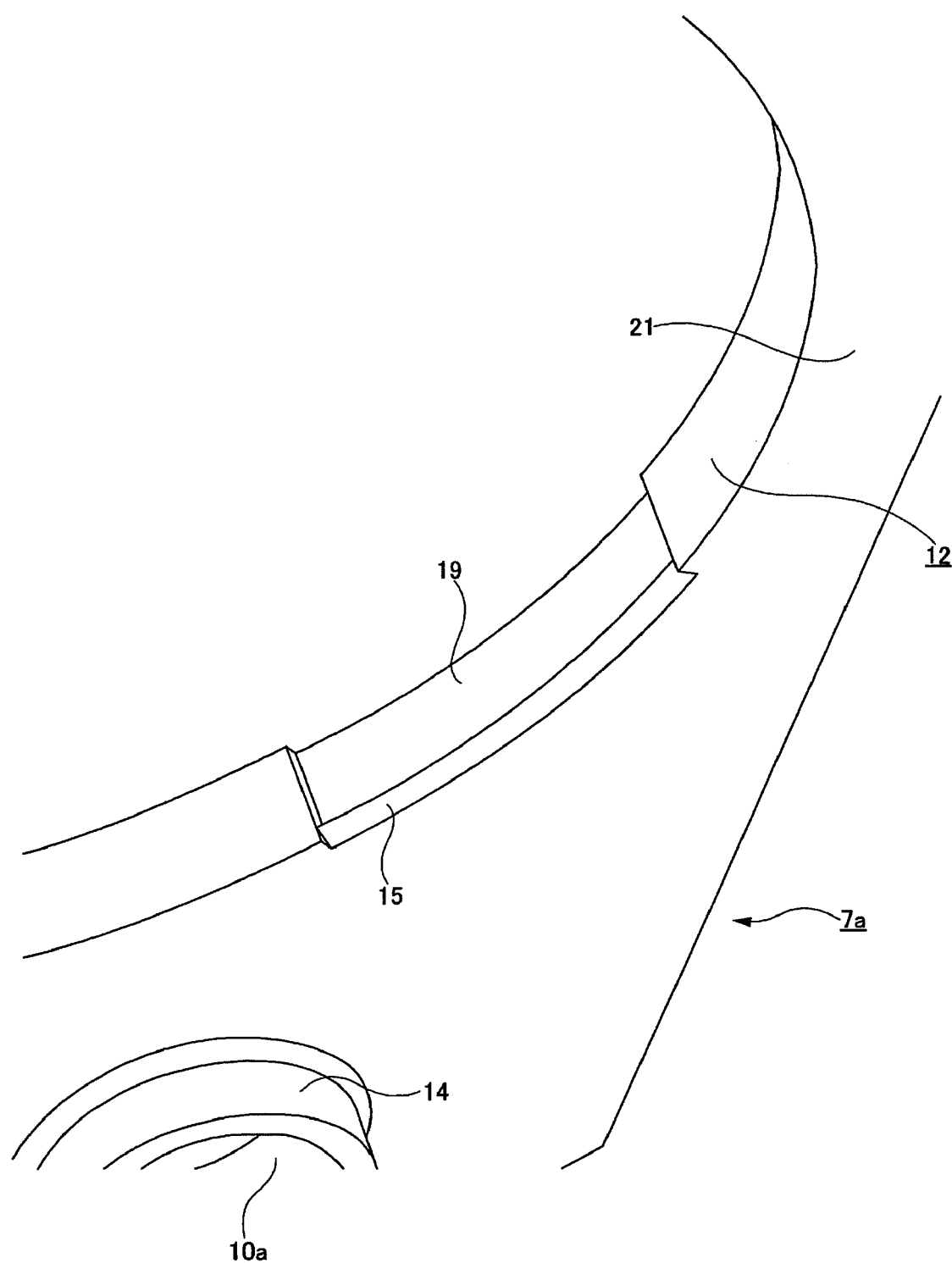
FIG. 9 is an enlarge view of a right lower portion of FIG. 8.

The retaining projection 15 is formed at one axial end of the larger-diameter portion 19 as shown in FIGS. 4 and 9. A larger-diameter outer circumferential surface is formed on the one axial end portion of the outer periphery of the outer ring 5a, while the smaller-diameter step portion 9a is formed on the other axial end portion of the outer periphery of the outer ring 5a, and a step surface 20 is formed between the larger-diameter outer circumferential surface and the smaller-diameter step portion 9a. When the retainer plate 7a is outwardly fitted on the smaller-diameter step portion 9a, the retaining projections 15 of the retainer plate 7a are disposed close to the step surface 20 formed at the one axial end side relative to the smaller-diameter step portion 9a. An inner circumferential surface of each retaining projection 15 is an inclined surface of a conical concave shape of which inner diameter gradually increases toward the one axial end portion of the larger-diameter portion 19 (toward the step surface 20). A distal end edge of each retaining projection 15 is disposed on or slightly radially outwardly of a circle on which the inner periphery of a main portion of the fitting hole 12 lies.

Figure 1:
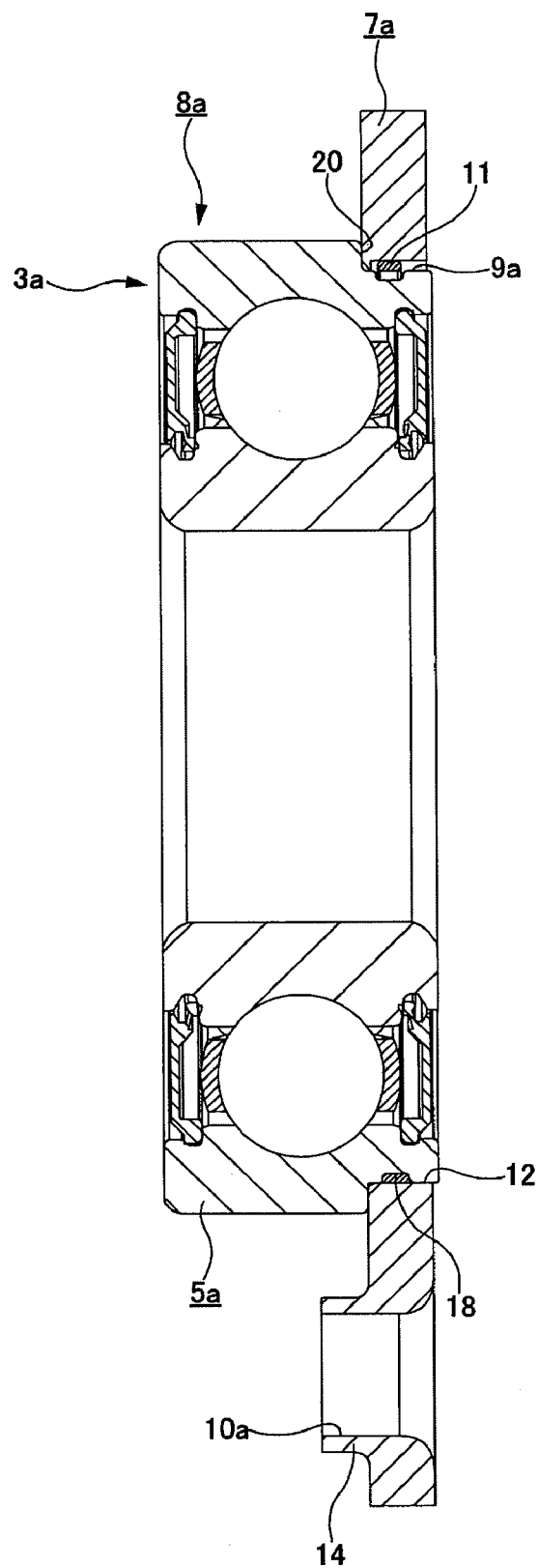
FIG. 1 is a cross-sectional view of a rolling bearing unit for a rotation support unit provided in accordance with a first embodiment of the present invention.
Figure 2:
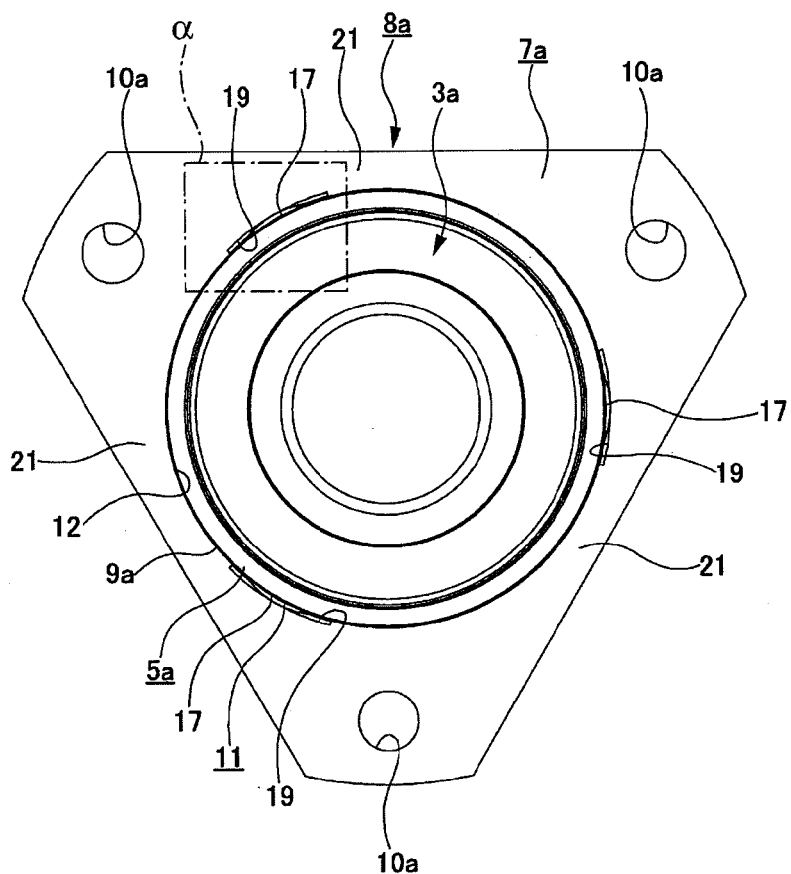
FIG. 2 is a view as seen from the right side of FIG. 1.

In this embodiment, as clear from FIGS. 2 and 7, the retainer plate 7a has a substantially triangular shape (an inequilateral hexagon) as obtained by cutting three circumferentially-spaced portions from a disk. The through holes or screw holes 10a are formed respectively through three circumferentially-spaced portions having the largest outer diameter. Therefore, the outer diameter of these largest-diameter portions having the respective through holes or screw holes 10a is much larger than an outer diameter of intervening portions 21 each lying between the adjacent largest-diameter portions. Each of the larger-diameter portions 19, which are formed respectively at the three portions of the inner circumferential surface of the fitting hole 12, is disposed in the intervening portion 21 at a position (circumferentially-central potion) between a portion of the intervening portion 21 at which the distance between the inner circumferential surface of the fitting hole 12 and the outer circumferential edge of the retainer plate 7a is the shortest and a portion where the through hole or screw hole 10a is formed.

The larger-diameter portions 19 are thus formed respectively at the above-mentioned portions other than the vicinities of the through holes or screw holes 10a to which a large stress is applied upon tightening of a bolt and small-width portions on which a large stress is liable to act. However, if such a stress developing upon tightening of the bolt is limited, it is not necessary that the larger-diameter portions 19 should be formed respectively at the above-mentioned portions. In this case, for example, the larger-diameter portions 19 may be formed respectively at those portions which are disposed in phase respectively with the through holes or screw holes 10a in the circumferential direction.

Figure 10:
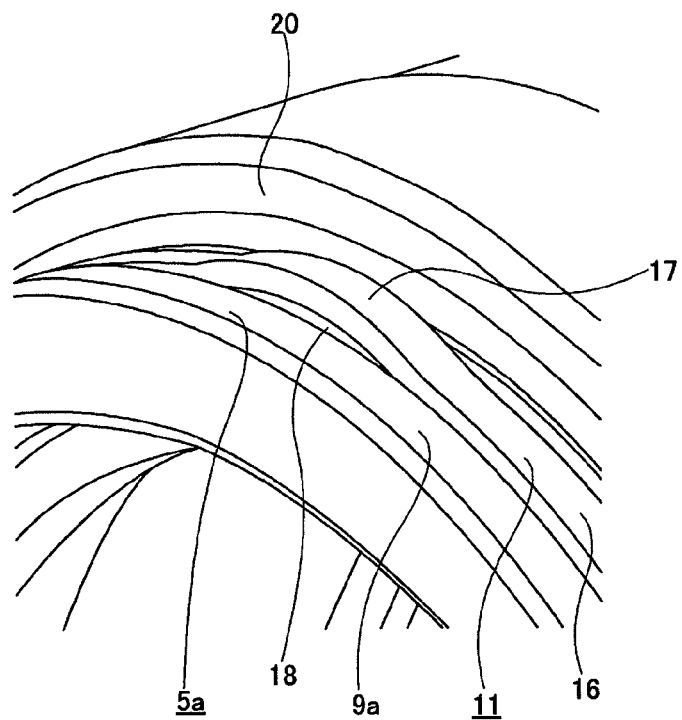
FIG. 10 is a fragmentary perspective view showing a condition in which the retaining ring is mounted on a smaller-diameter step portion of an outer ring.
Figure 11:
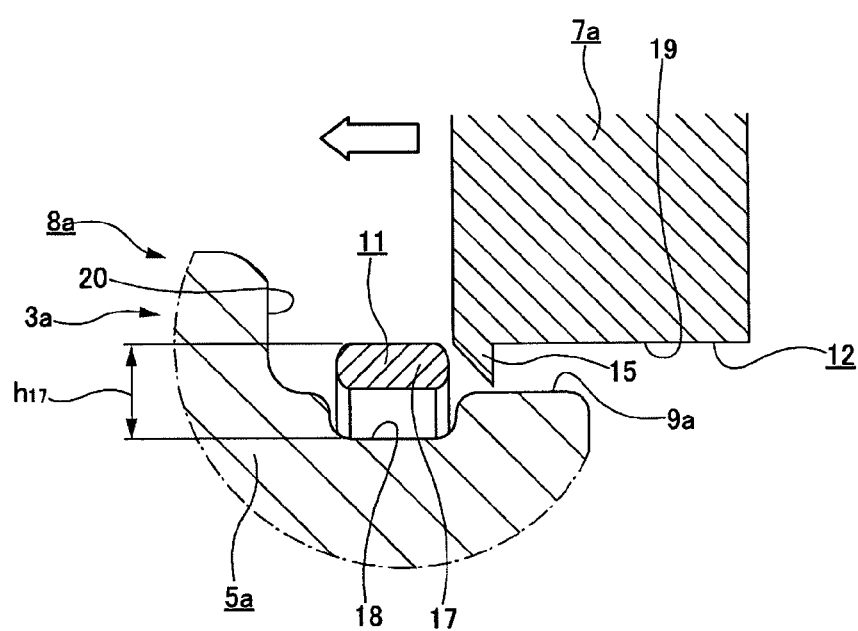
FIG. 11 is a view similar to FIG. 4, but showing a condition in which the retainer plate is to be fitted on the smaller-diameter step portion of the outer ring having the retaining ring mounted thereon.

For connecting the retainer plate 7a to the outer ring 5a through the retaining ring 11, first, the retaining ring 11 is attached to the retaining recessed groove 18 formed in the outer circumferential surface of the smaller-diameter step portion 9a of the outer ring 5a. In this attaching operation, the smaller-diameter portion 16 of the retaining ring 11 is fitted into the retaining recessed groove 18 while elastically expanding the inner diameter of the retaining ring 11. Because of its own elasticity, the thus fitted retaining ring 11 is retained in the retaining recessed groove 18 against disengagement. In this condition,; the plurality of larger-diameter portions 17 formed at the retaining ring 11 project radially outwardly from the outer circumferential surface of the smaller-diameter step portion 9a as shown in FIG. 10.

Figure 3:
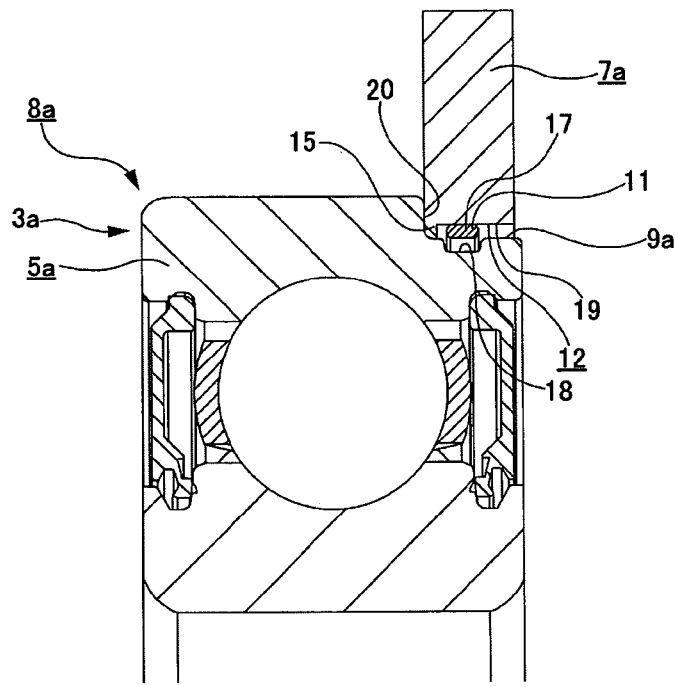
FIG. 3 is an enlarged view of an upper portion of FIG. 1.
Figure 12A:
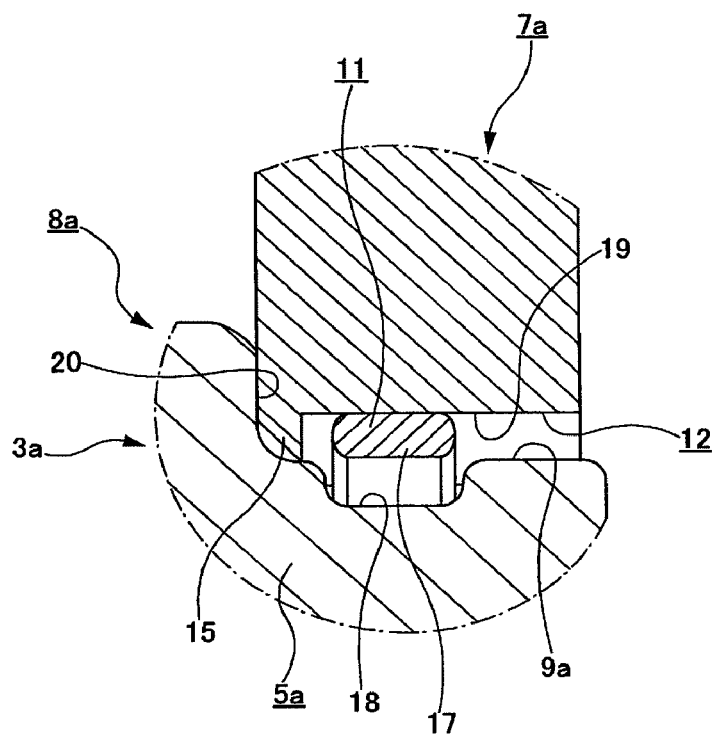
FIG. 12A is a cross-sectional view showing the above fitted condition at the same position as that of FIG. 11.

The retaining ring 11 is, thus attached to the retaining recessed groove 18, and then the retainer plate 7a is outwardly fitted on the smaller-diameter step portion 9a. In this outwardly fitting operation, the retaining projections 15 are opposed respectively to the larger-diameter portions 19 (that is, phases of the retaining projections 15 and the larger-diameter portions 19 are matched in the circumferential direction), and in this condition the retainer plate 7a is outwardly fitted onto the smaller-diameter step portion 9a as indicated by an arrow in FIG. 11. At this time, the inner circumferential surfaces of the retaining projections 15 formed on the inner circumferential surface of the fitting hole 12 of the retainer plate 7a are brought into engagement with the respective larger-diameter retaining portions, and compress these larger-diameter retaining portions 17, so that the retaining projections 15 are allowed to pass the respective larger-diameter retaining portions 17. After the retaining projections 15 being passed, the larger-diameter retaining portions 17 are elastically restored, and are opposed respectively to the retaining projections 15 in the axial direction as shown in FIGS. 3, 4 and 12A. Namely, each retaining projection 15 of the retainer plate 7a is disposed between the step surface 20 of the outer ring 5a and the corresponding larger-diameter retaining portion 17 of the retaining ring 11.

Figure 12B:
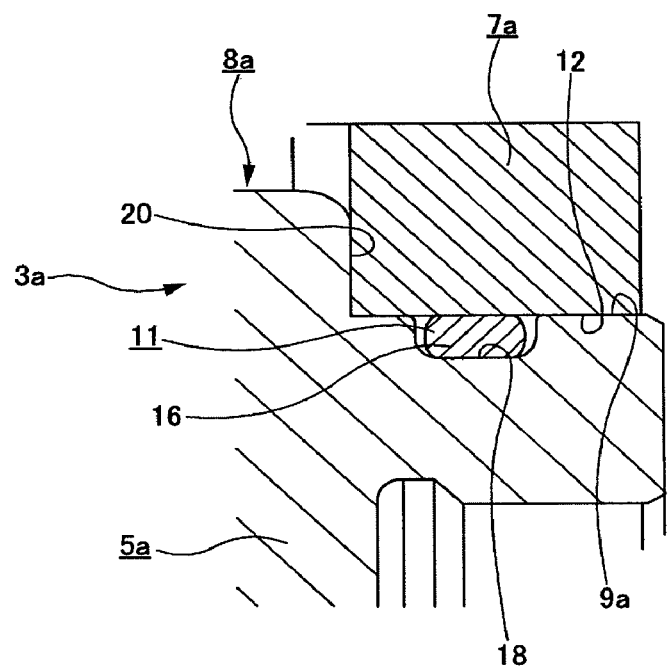
FIG. 12B is a cross-sectional view showing the above fitted condition at a position circumferentially spaced from the position of FIG. 11.

In this condition, the retaining ring 11 is prevented from falling off the outer ring 5a since the smaller-diameter portion 16 is engaged in the retaining recessed groove 18. Therefore, the retainer plate 7a is also prevented from being separated from the outer ring 5a. In this condition, the inner circumferential surface of the fitting hole 12 except the larger-diameter portions 19 is closely fitted on the smaller-diameter step portion 9a as shown in FIG. 12B. Therefore, the retainer plate 7a and the outer ring 5a are coupled together in substantially concentric with each other.

The rolling bearing unit 8a of this embodiment for a rotation support unit, which includes the above constituent members assembled together as described above, is mounted between the rotation shaft 1 and the housing 2 as shown in FIG. 30 as well as the above-mentioned conventional structure. The assembling procedure, etc., are similar to those of the above conventional structure. Here, before the distal ends or edges of the cylindrical portions 14 are brought into abutting engagement with the inner surface of the housing 2, the through holes or screw holes 10a are aligned with the respective screw holes or through holes 10a. The retainer plate 7a is brought into abutting engagement with the inner surface of the housing 2 by tightening the screws or by pushing the outer ring 5a into the retaining recess 4 after the above aligning operation is effected. Particularly in the rolling bearing unit 8a of this embodiment, the structure of combination of the outer ring 5a of the rolling bearing 3a and the retainer plate 7a for retaining the outer ring 5a in the holding recess 4 can be easily obtained at a low cost.

Namely, the retaining ring 11 for connecting the outer ring 5 and the retainer plate 7a together can be easily obtained by bending a resilient wire of metal such as spring steel of stainless steel, carbon steel and phosphor bronze or by injection molding a high-functional synthetic resin having superior elasticity, an oil resistance and a thermal resistance. In addition, the retaining recessed groove 18 for retaining the retaining ring 11 can be easily formed in the outer circumferential surface of the smaller-diameter step portion 9a of the outer ring 5a by a simple lathe turning operation. Furthermore, the larger-diameter portions 19 and the retaining projections 15 can be easily formed at the inner circumferential surface of the fitting hole 12 of the retainer plate 7a by press working such as stamping, pressing, etc. Therefore the above structure can be easily obtained at the low cost as described above. Furthermore, at the time of assembling, either of the outer ring 5a and the retainer plate 7a does not require any plastic working such as caulking (fixing using plastic deformation), and therefore part of them does not need to be kept relatively soft, and can secure necessary hardness by quench hardening.

Second Embodiment

Figure 13A:
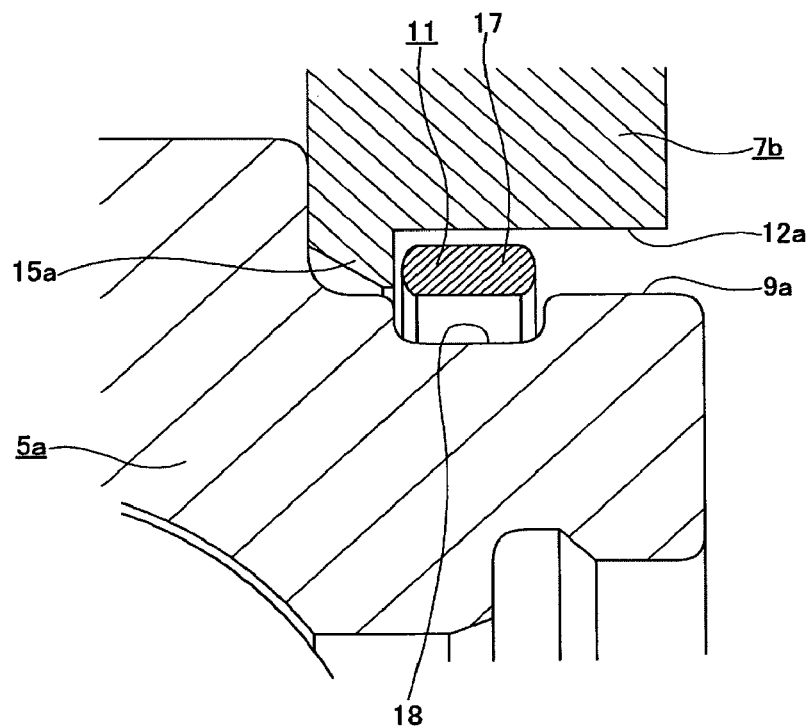
FIGS. 13A and 13B are views similar to FIGS. 12A and 12B, but showing a second embodiment of the invention.

FIG. 13 shows a second embodiment of the invention. In this embodiment, except for a region where a retaining projection 15a which is described later, an inner diameter of a fitting hole 12a formed through a central portion of a retainer plate 7b is sufficiently larger than an outer diameter of a smaller-diameter step portion 9a (on which the retainer plate 7b to be fitted and supported) formed on an outer circumferential surface of an end portion of an outer ring 5a (that is, larger than a circle circumscribing larger-diameter retaining portions 17 of a retaining ring 11). The retaining projection 15a is formed on one axial end of the inner circumferential surface of the fitting hole 12a over the entire periphery thereof, and projects radially inwardly from the inner circumferential surface of the fitting hole 12a. The basic shape of the retaining projection 15a is similar to that of the retaining projections 15 (see FIGS. 3, 4, 9, 11 and 12) of the above first embodiment.

Figure 13B:
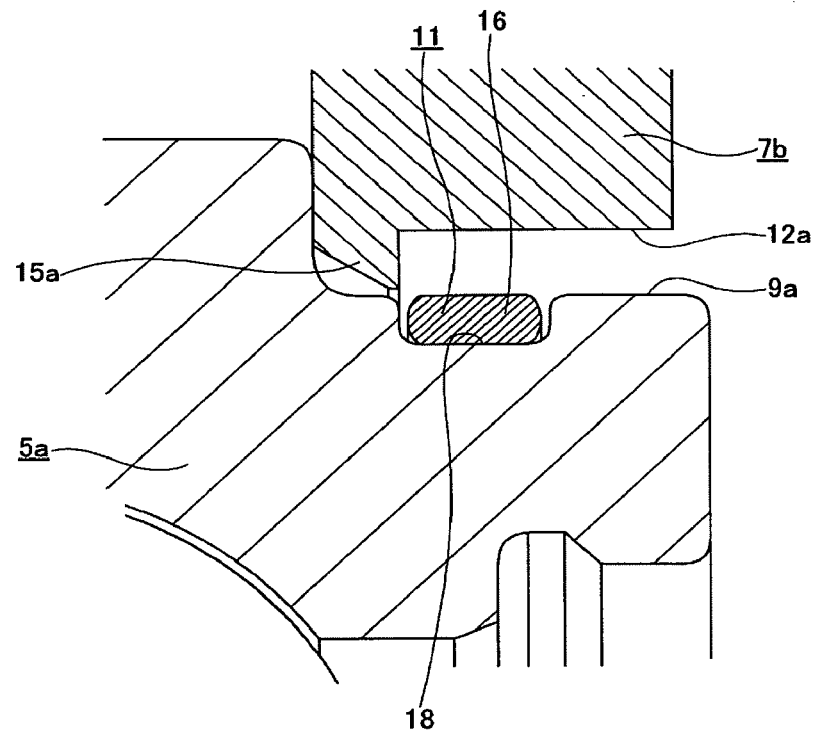

The fitting hole 12a of the retainer plate 7b and the retaining projection 15a are formed into the above-mentioned shapes, respectively. For assembling the structure of this embodiment, first, a smaller-diameter portion 16 of the retaining ring 11 is housed into a retaining recessed groove 18 formed in an axially-intermediate portion of the outer circumferential surface of the smaller-diameter step portion 9a as shown in FIG. 13B. Then, the fitting hole 12a is outwardly fitted on the smaller-diameter step portion 9a while passing the retaining projection 15a past the larger-diameter retaining portions 17 as described above for the first embodiment with reference to FIG. 11. As a result, the retaining projection 15a is disposed between a step surface 20 and the larger-diameter retaining portions 17, and the retaining projection 15a is engaged with the larger-diameter retaining portions 17 as shown in FIG. 13 A, thereby preventing the retainer plate 7b from falling off the smaller-diameter step portion 9a.

In the structure of this embodiment, when the retainer plate 7b and the outer ring 5a are coupled together, a distal end edge of the retaining projection 15a is in contact with or is closely opposed to the outer circumferential surface of the smaller-diameter step portion 9a. Although a contact area between this distal end edge and the outer circumferential surface becomes small, magnitude of a radial load applied between the retainer plate 7b and the outer ring 5a is such a small value that it is substantially equal to the weight of the retainer plate 7b or a rolling bearing unit including the outer ring 5a. Thus, this is not particularly important in actual use. The other portions are similar in structure and operation to those of the above first embodiment, and therefore the description and showing of such similar portions will be omitted.

Third Embodiment

FIG. 14 shows a third embodiment of the invention. An inner circumferential surface of a retaining projection 15b formed on an inner circumferential surface of a fitting-hole 12b formed through a central portion of a retainer plate 7c is formed by an inclined surface 22 and a concave cylindrical surface 23. The inclined surface 22 is formed at one axial end portion of the inner circumferential surface of the retaining projection 15b, and has a conical concave shape of which inner diameter increases toward the one axial end. When the fitting hole 12b is outwardly fitted on a smaller-diameter step portion 9a, the inclined surface 22 is disposed on one axial end portion of this smaller-diameter step portion 9a. The concave cylindrical surface 23 is formed on the other axial end portion of the inner circumferential surface of the retaining projection 15b, and the inner diameter thereof is constant along with the axial direction. When the fitting hole 12b is fitted on the smaller-diameter step portion 9a, the concave cylindrical surface 23 is disposed on substantially an axially-central portion of this smaller-diameter step portion 9a.

The retaining projection 15b formed on the inner circumferential surface of the fitting hole 12b of the retainer plate 7c is formed into the above-mentioned shape. For assembling the structure of this embodiment, the fitting hole 12b is outwardly fitted on the smaller-diameter step portion 9a in the sequence from FIG. 14A, to FIG. 14C as described above for the second embodiment. At this time, the retaining projection 15 is pushed onto the smaller-diameter step portion 9a toward the one axial end thereof while the larger-diameter retaining portions 17 of a retaining ring 11 are elastically compressed by this retaining projection 15b. When this pushing operation is finished, the retaining projection 15b is disposed between a step surface 20 and the larger-diameter retaining portions 17 as shown in FIG. 14C, and the retaining projection 15b is engaged with the larger-diameter retaining portions 17, thereby preventing the retainer plate 7c from falling off the smaller-diameter step portion 9a. In this condition, the concave cylindrical surface 23 opposes to an axially one end side cylindrical surface of the smaller-diameter step portion which is located axially one end side relative to the retaining recessed groove 18 formed on the axially intervening portion of the smaller-diameter step portion 9a.

In the structure of this embodiment, when the assembling operation is completed, the concave cylindrical surface 23 abut with or closely opposes to the one axial end portion of the smaller-diameter step portion 9a. An area of contact between the concave cylindrical surface 23 and the one axial end portion of the smaller-diameter step portion 9a is increased to a certain degree. Therefore, even if a large radial load is applied between the retainer plate 7c and the outer ring 5a as upon striking of the retainer plate 7c against other object, for example, during transportation of this rolling bearing unit for a rotation support unit, damage such as a scratch is less liable to develop on the concave cylindrical surface 23 and the one axial end portion of the smaller-diameter step portion 9a which contact each other. Furthermore, when the retaining projection 15b passes past the larger-diameter retaining portions 17 as shown in FIG. 14B, damage such as a scratch is less liable to be formed on the outer circumferential surfaces of the larger-diameter retaining portions 17 by the inner circumferential edge of the retaining projection 15b. The other portions are similar in structure and operation to those of the above second embodiment shown in FIG. 13, and therefore the description and showing of such similar portions will be omitted.

Fourth Embodiment

Figure 15A:
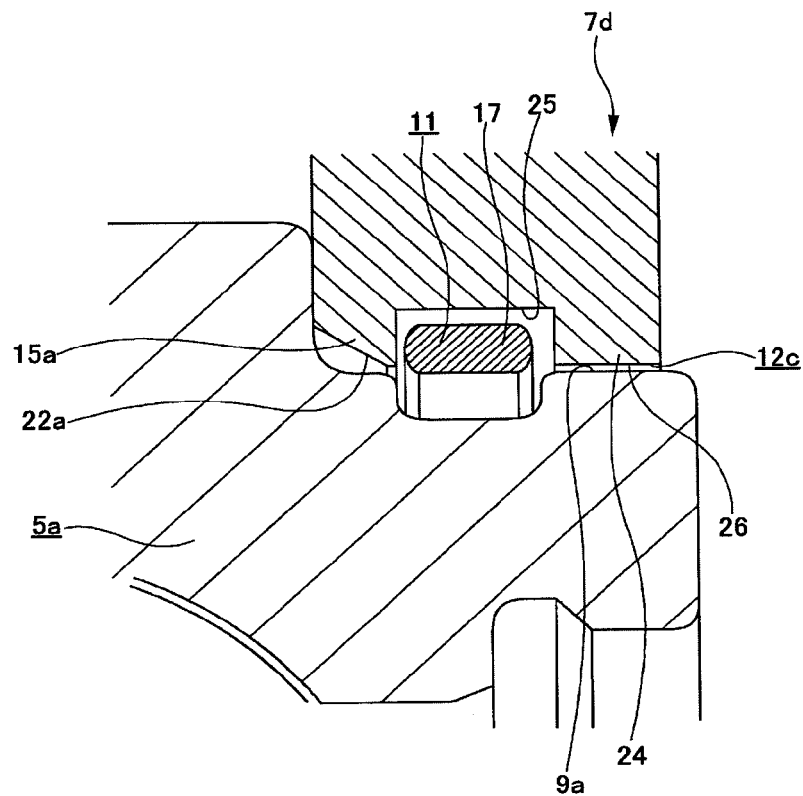
FIGS. 15A and 15B are views similar to FIGS. 12A and 12B, but showing a fourth embodiment of the invention.
Figure 15B:
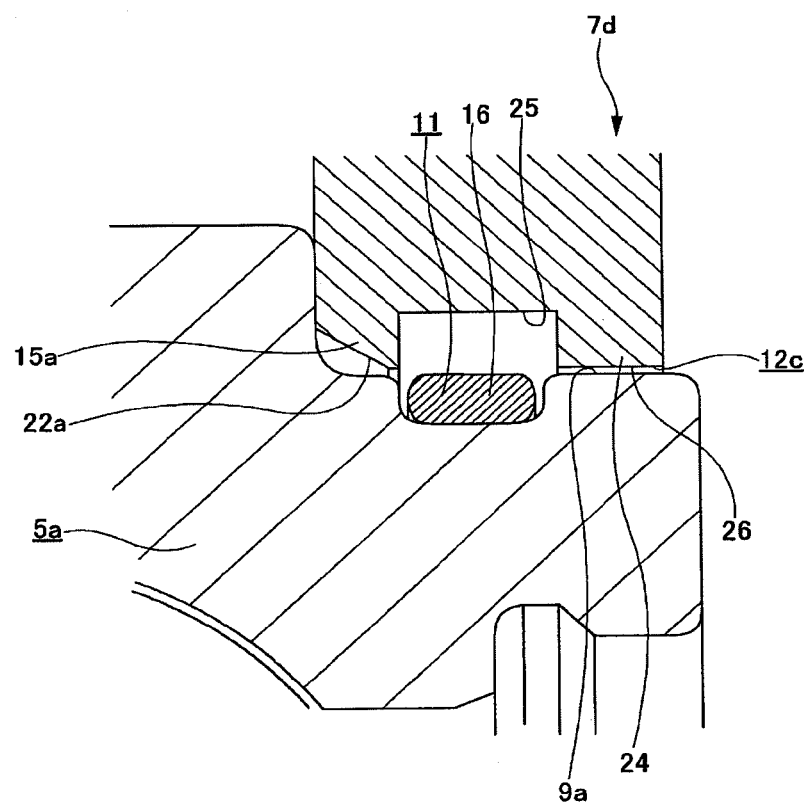

FIG. 15 shows a fourth embodiment of the invention. In this embodiment, a retaining projection 15a and a support projection 24 are formed respectively on axially-opposite end portions; of an inner circumferential surface of a fitting hole 12c formed through a central portion of a retainer plate 7d, and are spaced from each other in the axial direction. In other words, the retaining projection 15a is formed on one axial end portion of the inner circumferential surface of the fitting hole 12c over the entire periphery thereof, and the support projection 24 is formed on the other axial end portion of this inner circumferential surface over the entire periphery thereof, and an outer-diameter recessed retaining recessed groove 25 is formed between the two projections 15a and 24 over the entire periphery thereof. When the fitting hole 12c is outwardly fitted on a smaller-diameter step portion 9a formed on an outer circumferential surface of an end portion of an outer ring 5a, the retaining projection 15a is disposed on one axial end side of the smaller-diameter step portion 9a. On the other hand, the support projection 24 is disposed opposite side of the retaining projection 15a while interposing the outer-diameter retaining recessed groove 25 therebetween. An inner circumferential surface of the retaining projection 15a is defined by an inclined surface 22a gradually increasing in inner diameter away from the outer-diameter retaining recessed groove 25. On contrary, an inner circumferential surface of the support projection 24 is defined by a concave cylindrical surface 26 of which inner diameter is constant along with the axial direction.

In this embodiment in which the support projection 24 is provided, when the fitting hole 12c is outwardly fitted on the smaller-diameter step portion 9a formed on the outer circumferential surface of the end portion of the outer ring 5a of a rolling bearing unit, larger-diameter retaining portions 17 of a retaining ring 11 are engaged with the retaining projection 15a, thereby preventing the retainer plate 7d from falling off the smaller-diameter step portion 9a. Also, the inner circumferential surface of the support projection 24 is opposed to the, other axial end portion of the smaller-diameter step portion 9a. Because the inner circumferential surface of this support projection 24 is the concave cylindrical surface and the outer circumferential surface of the other axial end portion of the smaller-diameter step portion 9a is a concave cylindrical surface, these two cylindrical surfaces differ only slightly in radius curvature from each other, and therefore contact each other with a large area. Thus, even if a large radial load is applied between the retainer plate 7d and the outer ring 5a as upon striking of the retainer plate 7d against other object, for example, during transportation of this rolling bearing unit for a rotation support unit, damage is less liable to develop on the connected portion between the retainer plate 7d and the outer ring 5a. The other portions are similar in structure and operation to those of the above second embodiment shown in FIG. 13, and therefore the description and showing of such similar portions will be omitted.

Fifth Embodiment

Figure 16A:
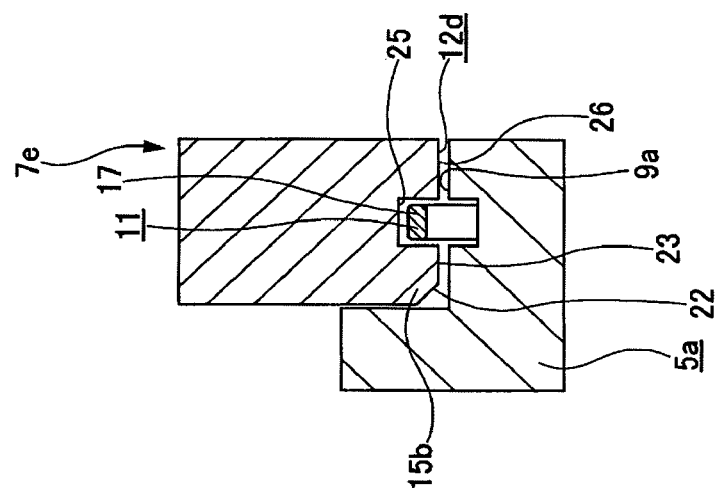
FIGS. 16A to 16C are views similar to FIGS. 14A to 14C, but showing a fifth embodiment.
Figure 16B:
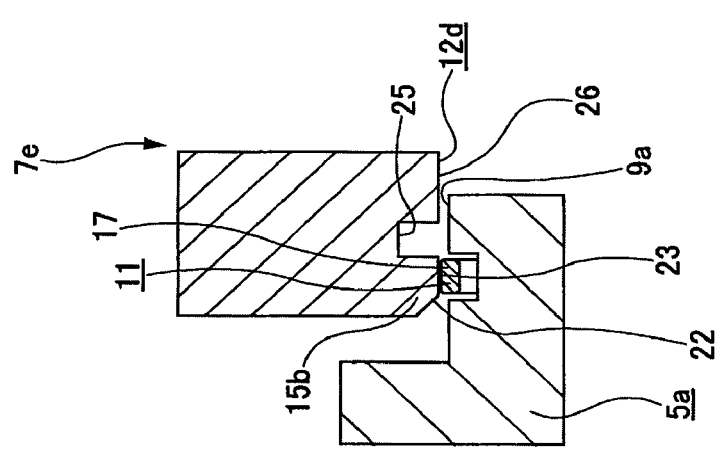
Figure 16C:
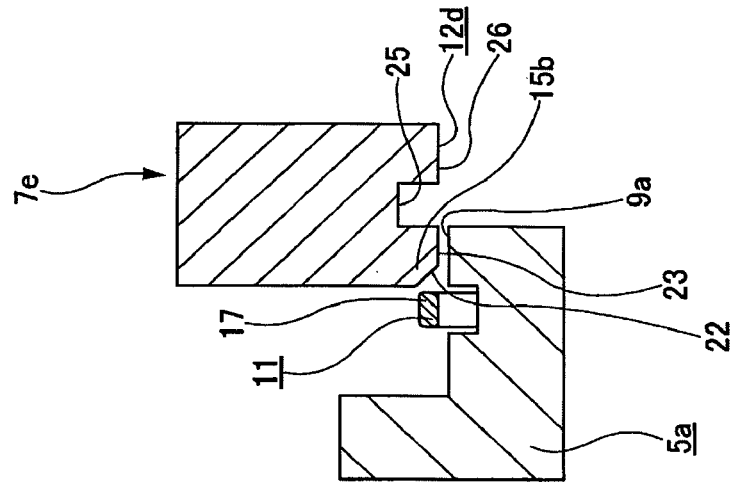

FIG. 16 shows a fifth embodiment of the invention. This embodiment has a structure as obtained by a combination of the above fourth and third embodiments. Namely, in this embodiment, an inner circumferential surface of a retaining projection 15b formed on an inner circumferential surface of a fitting hole 12d formed through a central portion of a retainer plate 7e is formed by an inclined surface 22 and a concave cylindrical surface 23. Also, a concave cylindrical surface 26 which is equal in diameter to the concave cylindrical surface 23 and is concentric therewith is formed on a potion opposite to the retaining projection 15b while interposing the outer-diameter retaining recessed groove 25 therebetween. Therefore, in the structure of this embodiment, when the assembling operation is completed as shown in FIG. 16C, the two concave cylindrical surfaces 23 and 26 are in contact with or are closely opposed to outer circumferential surfaces of opposite end portions of a smaller-diameter step portion 9a formed on an outer circumferential surface of an end portion of an outer ring 5a which constitutes the rolling bearing unit. Areas of contact of the two concave cylindrical surfaces 23 and 26 with the axially one end of the smaller-diameter step portion 9a are sufficiently large, and therefore the connected portion between the retainer plate 7e and the outer ring 5a is more positively prevented from being damaged. The other portions are similar in structure and operation to those of the above second embodiment shown in FIG. 13, and therefore the description and showing of such similar portions will be omitted.

Sixth Embodiment

Figure 17A:
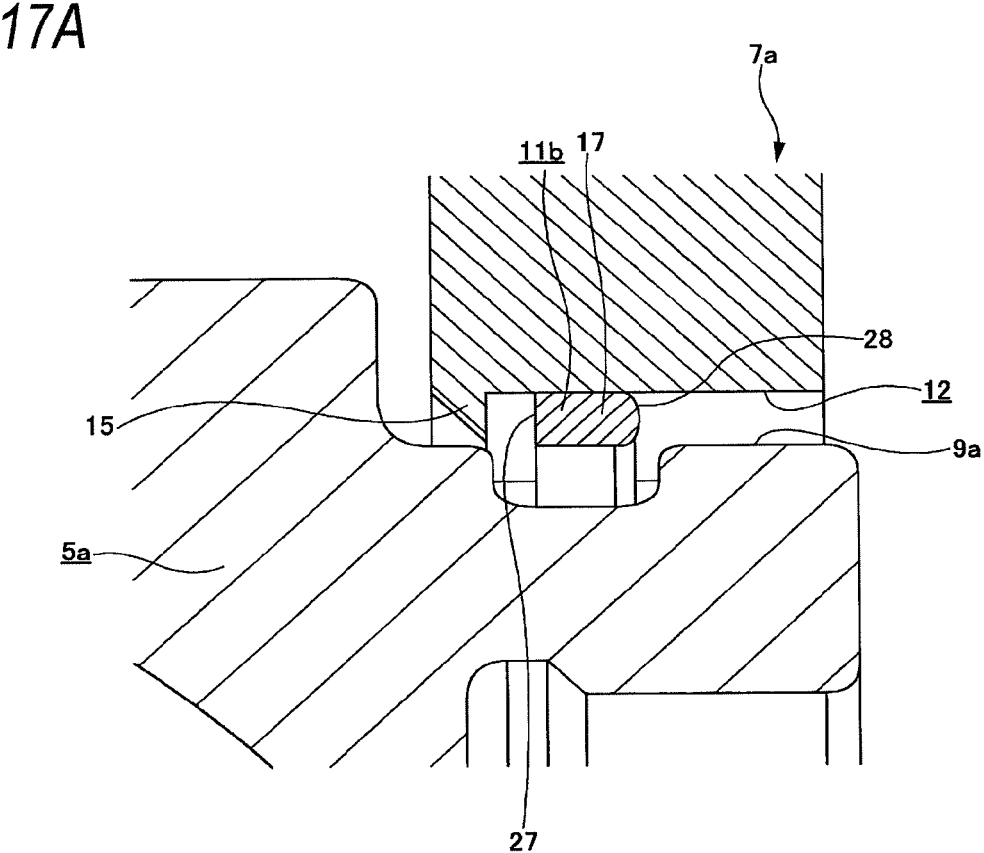
FIGS. 17A and 17B are views similar to FIGS. 12A and 12B, but showing a sixth embodiment.
Figure 17B:
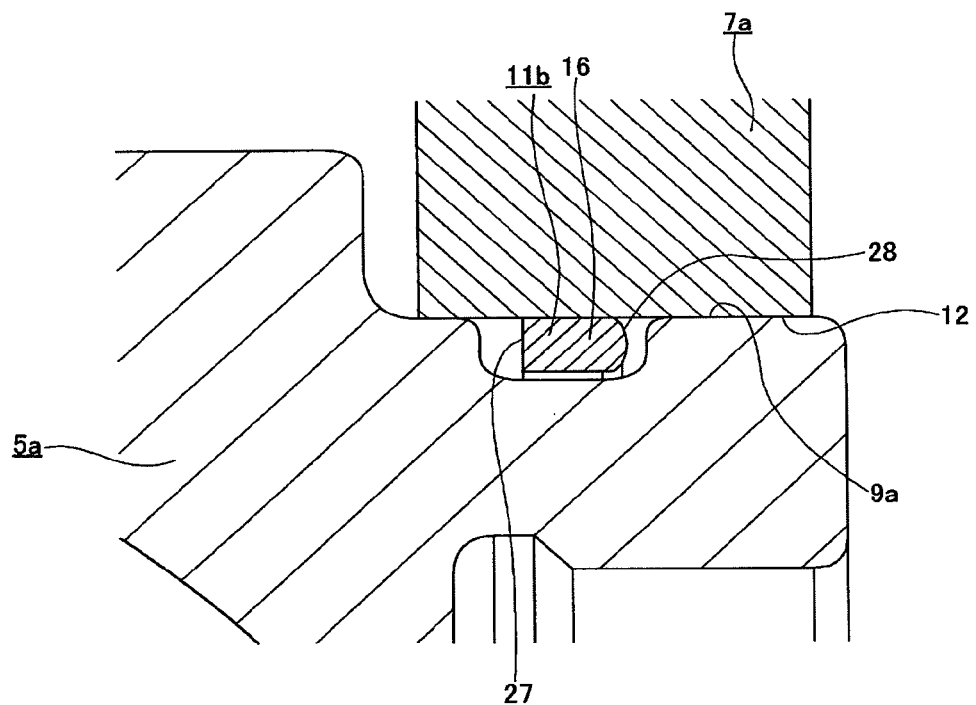

FIGS. 17 and 18 show a sixth embodiment of the invention. In this embodiment, a retaining ring 11b has such a cross-sectional shape that retaining projections 15 formed on an inner circumferential surface of a fitting hole 12 of a retainer plate 7a can be easily engaged with larger-diameter retaining portions 17 of the retaining ring 11b and that this engaged condition can not be easily canceled. More specifically, the cross-sectional shape of the retaining ring 11b is such that a face of the retaining ring 11b at one axial end side is a flat surface 27 disposed perpendicular to a center axis of the retaining ring 11b. The other axial end side of the retaining ring 11b is formed into an inclined surface 28 which is sharpened from the one axial end side, that is, gradually decreasing in outer diameter toward a distal end thereof. Therefore, the cross-section of the retaining ring 11b has a bullet-shape.

Figure 18C:
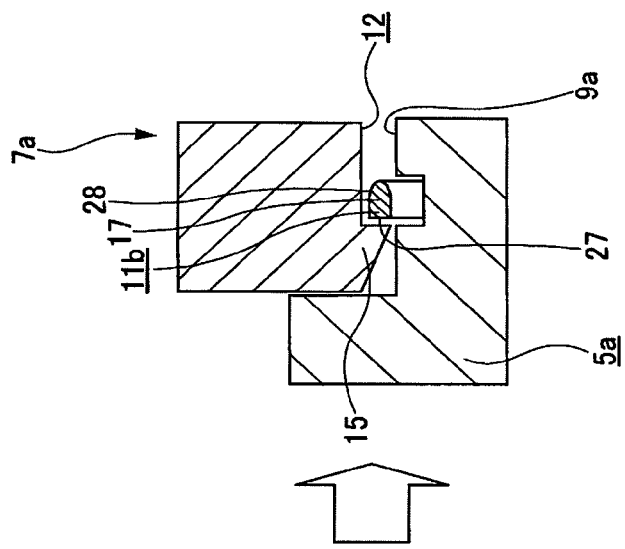
FIG. 18A to 18C are views sequentially showing the steps of connecting a retainer plate to an outer ring in the sixth embodiment.
Figure 18B:
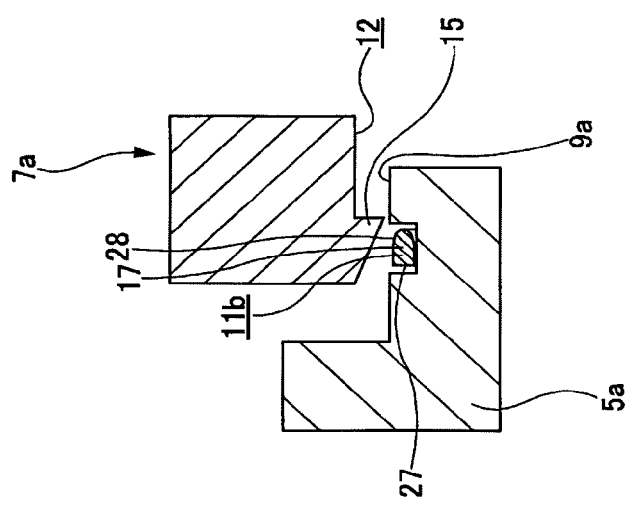
Figure 18A:
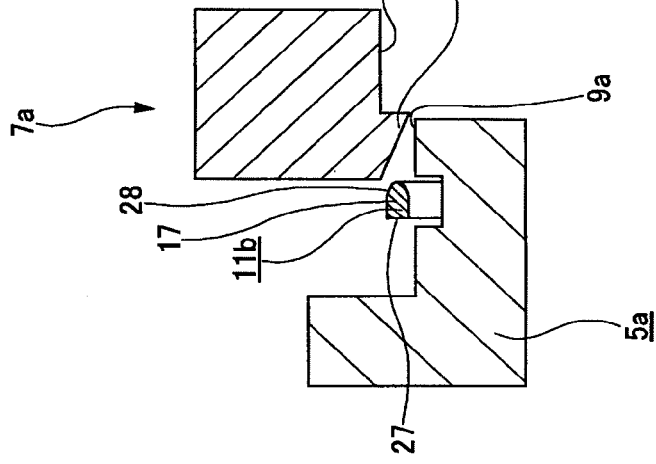

In the structure of this embodiment in which the retaining ring 11b has the above cross-sectional shape, when the retainer plate 7a is to be connected to the outer ring 5a in the sequence from FIG. 18A to 18C, inner circumferential surfaces of the retaining projections 15 can be easily brought into engagement with outer circumferential surfaces of the respective larger-diameter retaining portions 17, and therefore the retaining projections 15 can be easily engaged with the respective larger-diameter retaining portions 17. When the retaining projections 15 are thus engaged with the respective larger-diameter retaining portions 17, each retaining projection 15 contacts the flat surface 27 with a large area, and besides a force acting on the contact portion is directed only in the axial direction, and the retaining projections 15 can be positively prevented from being disengaged from the respective larger-diameter retaining portions 17. The structure of this embodiment is similar to the structure of the first embodiment of FIGS. 1 to 12 except that the retaining ring 11b has the different cross-sectional shape, and therefore the description and showing of similar portions will be omitted.

Incidentally, the retaining ring 11b of the bullet-shaped cross-section employed in this embodiment can be applied not only to the structure of the first embodiment but also to the structures of the second to fifth embodiments as shown in FIGS. 13 to 16.

Seventh Embodiment

Figure 19A:
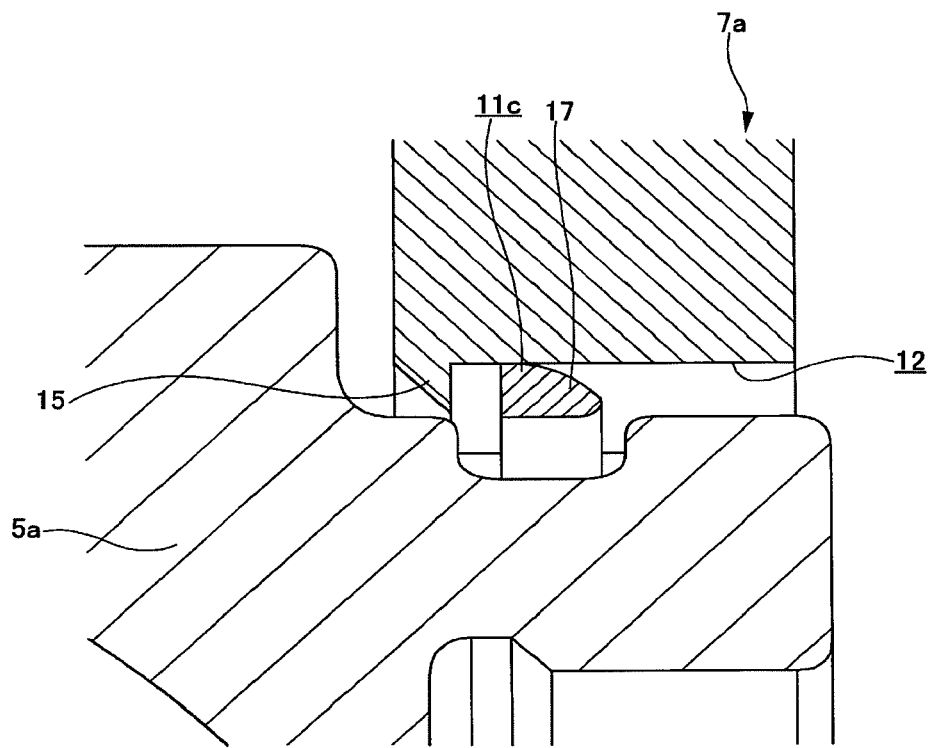
FIGS. 19A and 19B are views similar to FIG. 12, but showing a seventh embodiment of the invention.
Figure 19B:
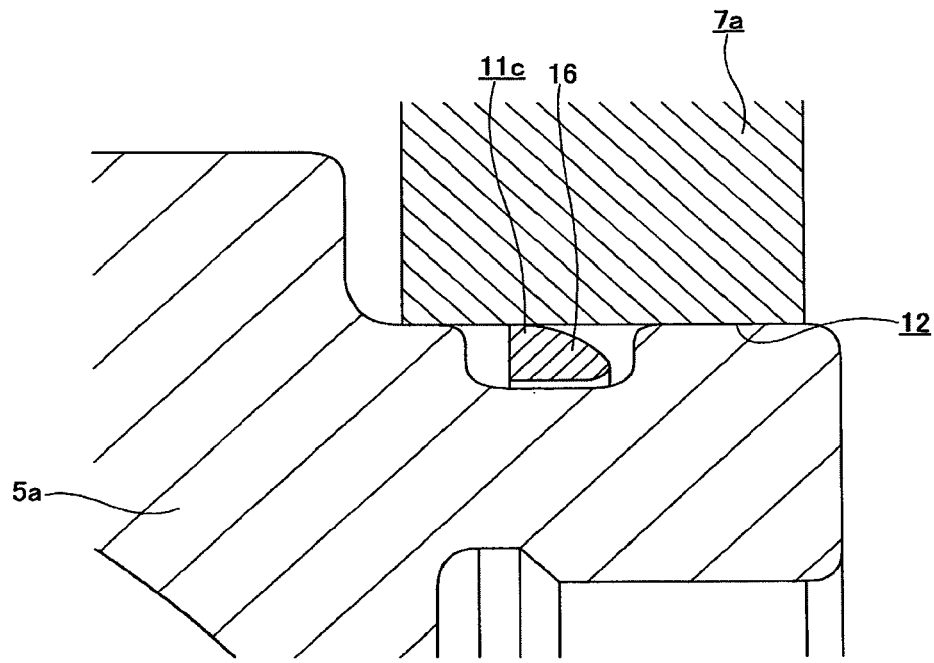

FIGS. 19 to 20 show a seventh embodiment. In this embodiment, a retaining ring 11c; has such a cross-sectional shape that retaining projections 15 formed on an inner circumferential surface of a fitting hole 12 of a retainer plate 7a can be easily engaged with larger-diameter retaining portions 17 of the retaining ring 11c as in the above sixth embodiment and that this engaged condition can not be easily canceled after once, engaged. In view of this, in this embodiment, the cross-sectional shape of the retaining ring 11c is such that an outer circumferential surface of the retaining ring 11c has a convex arc-shaped cross-section, and the retaining ring 11c has a substantially triangular cross-section. In the structure of this embodiment when the retainer plate 7a is to be connected to the outer ring 5a, inner circumferential surfaces of the retaining projections 15 can be easily brought into engagement with outer circumferential surfaces of the respective larger-diameter retaining portions 17, and therefore the retaining projections 15 can be easily engaged; with the respective larger-diameter retaining portions 17. The other portions are similar in structure and operation to those of the above sixth embodiment, and therefore the description and showing of such similar portions will be omitted.

Eighth Embodiment

Figure 21A:
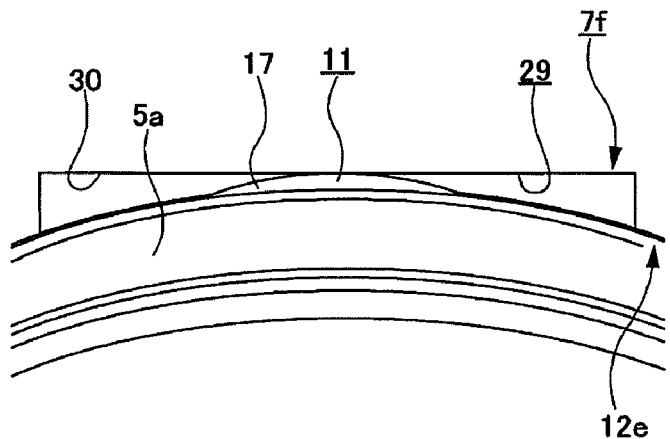
FIG. 21A is an enlarged view of a portion of an eight embodiment corresponding to a portion a of FIG. 2, showing a retaining portion of a retaining ring as disposed in a neutral position in a recess portion.
Figure 21B:
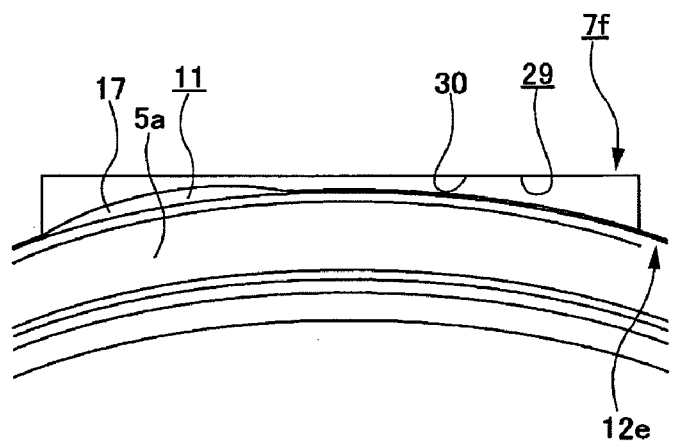
Figure 21C:
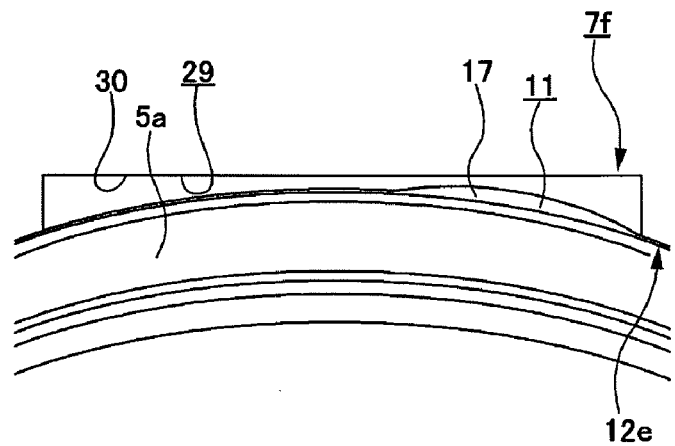

FIG. 21 shows an eighth embodiment of the invention. In this embodiment, recess portions 29 formed respectively in a plurality of portions (for example, three portions at equal intervals in a circumferential direction) of an inner circumferential surface of a fitting hole 12e of a retainer plate 7f have an angular shape. More specifically, a bottom surface 30 of the recess portion 29 is a flat surface. Also, the bottom surface 30 is disposed perpendicular to a radial direction of the fitting hole 12e at a circumferentially-intermediate portion of this recess portion 29 (that is, disposed parallel to a line tangent to this intermediate portion). Therefore, in this embodiment, the distance between the bottom surface 30 of the recess portion 29 and a bottom surface of a retaining recessed groove 18 (see, for example; FIGS. 3 and 4) which retains a retaining ring 11 is larger at circumferentially-opposite end portions of the recess portion 29 than at a circumferentially-central portion thereof.

In this embodiment, the recess portions 29 of the above shape are provided, and therefore a force required for rotating or angularly moving the retainer plate 7f relative to an outer ring 5a can be reduced. Namely, when the outer ring 5a is inwardly fitted in an interference manner into the holding recess 4 (see FIG. 30) of the housing 2, there is a possibility that phases of the through holes or screw holes 10a formed through the retainer plate 7f are slightly shifted from respective phases of the screw holes or through holes formed in the housing 2. In order to overcome this problem, the retainer plate 7f need to be angularly moved relative to the outer ring 5a, and in order to keep the force, required for the angular movement, to a low level, it is preferred that the friction between an apex portion of each larger-diameter retaining portion 17 of the retaining ring 11 and the bottom surface 30 of the recess portion 29 should be kept to a low level. In this embodiment, in a neutral condition shown in FIG. 21A, the apex portion of each larger-diameter retaining portion 17 abuts against the bottom surface 30 of the recess portion 29, and then when the retainer plate 7f is angularly moved relative to the outer ring 5a in one of opposite directions, the apex portion of the larger-diameter retaining portion 17 is separated from the bottom surface 30 of the recess portion 29. Therefore, the force required for angularly moving the retainer plate 7f relative to the outer ring 5a is kept to a low level.

Figure 22:
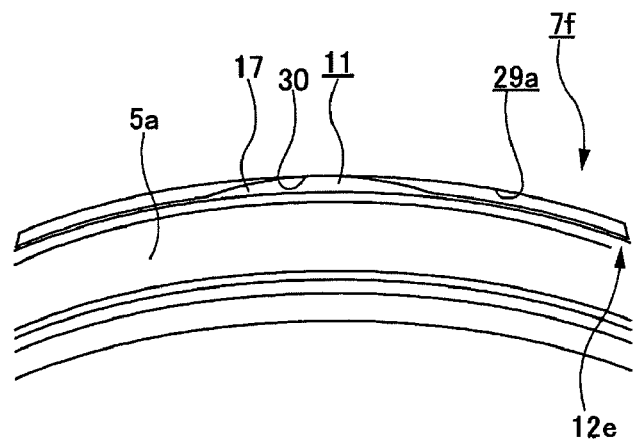
FIG. 22 is a view similar to FIG. 21A, but explaining a disadvantage encountered with a structure different from the structure of the eighth embodiment.

On the other hand, in the case where each recess portion 29a is disposed in concentric relation to the outer ring 5a as shown in FIG. 22, although the phases of the through holes or screw holes 10a can be matched with the phase of the respective screw holes or through holes in the housing by securing a sufficient length of the recess portions 29a in the circumferential direction, each larger-diameter retaining portion 17 still abuts against the bottom surface 30 of the recess portion 29a, so that large force is required for angularly moving the retainer plate 7f relative to the outer ring 5a.

Ninth Embodiment

Figure 23:
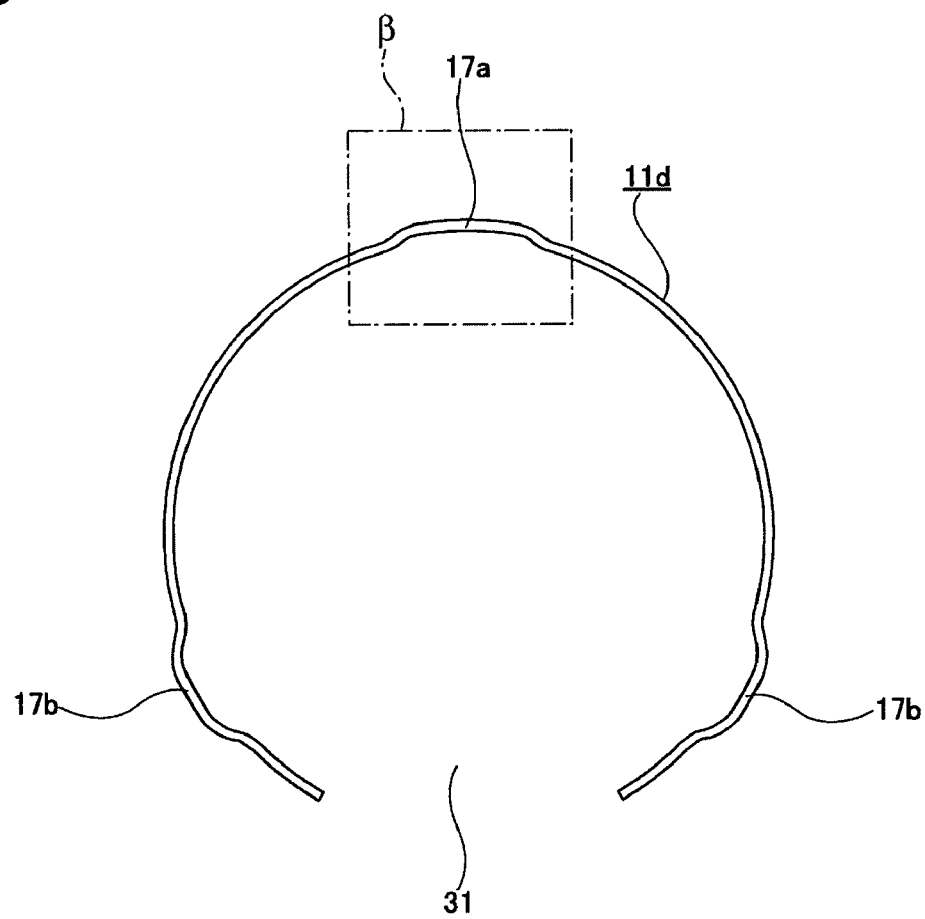
FIG. 23 is a view similar to FIG. 6, but showing a ninth embodiment of the invention.
Figure 24:
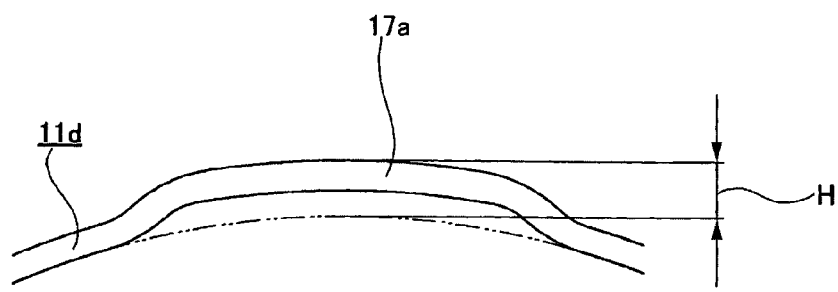
FIG. 24 is an enlarged view of a portion β of FIG. 23, showing the projection amount of a larger-diameter retaining portion.

FIGS. 23 and 24 show a ninth embodiment of the invention. In this embodiment, recess portions such as larger-diameter portions 19 (see, for example, FIGS. 1 to 4) are formed respectively at three portions of an inner circumferential surface of a fitting hole 12 of a retainer plate 7a, and also larger-diameter retaining portions 17a and 17b are formed respectively at three portions of a retaining ring lid. More specifically, the larger-diameter retaining portion 17a is formed at a circumferentially-intermediate (or circumferentially-central) portion of the retaining ring lid remote from an interrupted portion 31 thereof, and the other two larger-diameter retaining portions 17b are disposed near to the interrupted portion 31. The amount of projecting of the larger-diameter retaining portion 17a in a radially-outward direction is smaller than the amount of projecting of each larger-diameter retaining portion 17b in the radially-outward direction. Here, "the amount of projecting" means the distance from a circle inscribed in the retaining ring 11d to the apex of the larger-diameter retaining portion 17a, 17b as indicated by H in FIG. 24.

In this embodiment, because the amount of projecting of each larger-diameter retaining portion 17a, 17b is limited as described above, a force required for bringing the larger-diameter retaining portion 17a, 17b into retaining engagement with a retaining projection 15 (see, for example, FIGS. 1 to 4 and 7 to 9) formed at the larger-diameter portion 19 can be reduced. Namely, in this embodiment, because the amount of projecting of the two larger-diameter retaining portions 17b and 17b disposed near to the interrupted portion 31 is relatively large, when the larger-diameter retaining portions 17a and 17b are to be brought into retaining engagement with the respective retaining projections 15, first, the two larger-diameter retaining projections 17b and 17b are engaged with the corresponding larger-diameter portions 19, and thereafter the larger-diameter retaining portion 17a remote from the interrupted portion 31 is engaged with the corresponding larger-diameter portion 19. The two larger-diameter retaining portions 17b and 17b are disposed near to the interrupted portion 31, and can be easily elastically deformed since those portions of a base portion (a smaller-diameter portion other than the larger-diameter retaining portions 17a and 17b) of the retaining ring lid near to the larger-diameter retaining portions 17b and 17b can be easily displaced in the circumferential direction. Further, the larger-diameter retaining portion 17a remote from the interrupted portion 31 can not be so easily displaced in the circumferential direction, and therefore can not be so easily elastically deformed. However, the amount of projecting of this larger-diameter retaining portion 17a is small, and thus the amount of elastic deformation thereof required for the above retaining engagement is reduced. Therefore, the force required for retainingly engaging each larger-diameter retaining portion 17a, 17b with the retaining projection 15 can be reduced.

In the structure of this embodiment, if all of the larger-diameter retaining portions have the same projection amount, all of these larger-diameter retaining; portions must be simultaneously elastically deformed in a direction to reduce the projection amount when effecting the retaining operation for retainingly engaging the larger-diameter retaining portions with respective retaining portions. In this condition, forces act respectively on opposite end portions of that portion of the base portion of the retaining ring lying between the adjacent larger-diameter retaining portions so as to urge these opposite end portions toward each other, and therefore the force required for elastically deforming the larger-diameter retaining portions and hence the force required for effecting the retaining operation for retainingly engaging the larger-diameter retaining portions with the respective retaining portions are increased.

In contrast with the structure of this embodiment, if the larger-diameter retaining portion formed at the circumferentially-intermediate portion of the retaining ring remote from the interrupted portion thereof is larger in the amount of radially outward projection than the other two larger-diameter retaining portions disposed near to the interrupted portion, the force required for effecting the retaining operation is increased. In this case, the larger-diameter retaining portion at the circumferentially-intermediate portion is first elastically compressed, and the base portion of the retaining ring is pushed toward opposite sides in the circumferential direction. Therefore, the friction between this retaining ring and the retaining groove portion which rub against each other is increased, and the force required for elastically deforming the larger-diameter retaining portion at the circumferentially-intermediate portion and hence the force required for effecting the retaining operation for retainingly engaging the larger-diameter retaining portions with the respective retaining portions are increased. In the structure of this embodiment, the force required for effecting the retaining operation will not be increased by such factors, Tenth Embodiment FIGS. 25 and 26 show a tenth embodiment of the invention. The above embodiments are based on the assumption that the outer ring 5a is fitted in the holding recess 4 (see FIG. 30) of the housing 2 by a sufficiently tight interference fit (so that creep will not occur even when the temperature rises), and therefore is prevented from rotation (creep) during the operation. Therefore, in the above embodiments, there is not provided any means for positively preventing a relative rotation between the outer ring 5a and the retainer plate 7a through 7f. On the other hand, in this embodiment, an outer ring 5a is inwardly fitted in the retaining recess 4 of the housing 2 by an interference fit which does not always provide a sufficient fitting strength (which interference fit is rather close to a clearance fit or is at such a level that creep may occur when the temperature rises), but a structure for preventing a relative rotation of the outer ring 5a and a retainer plate 7g in a specified direction is provided between the outer ring 5a and the retainer plate 7g.

Therefore, in this embodiment, a depth of each of recess portions 29b formed respectively in a plurality of portions of an inner circumferential edge of a fitting hole 12f formed through the retainer plate 7g is smaller at its one circumferential end portion (right side in FIGS. 25 and 26), and is larger at the other circumferential end portion (left side in FIGS. 25 and 26). At an assembling state of the rotation support unit, assembling direction is restricted so that a force acts on the outer ring 5a in a clockwise direction (in FIGS. 25 and 26). In FIG. 25, the showing of a retaining projection 15b (see FIG. 26) formed at an axial end portion of each recess portion 29b is omitted.

Figure 25A:
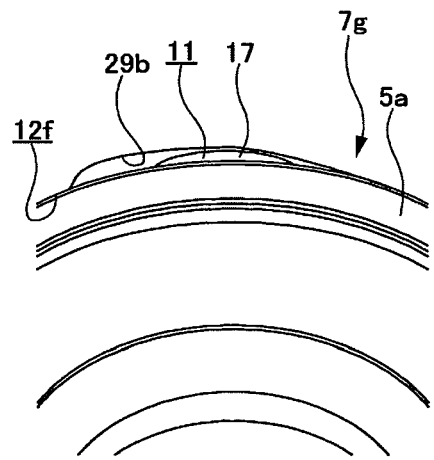
FIGS. 25A to 25C are views similar to FIGS. 21A to 21C, but showing a tenth embodiment of the invention.
Figure 25B:
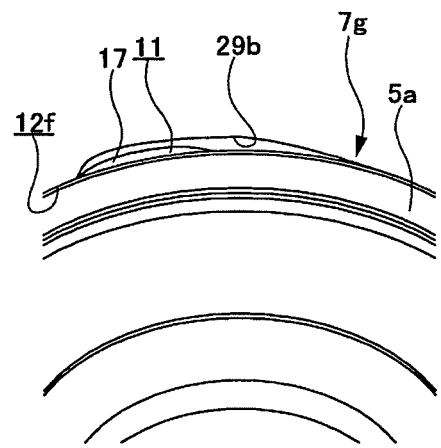
Figure 25C:
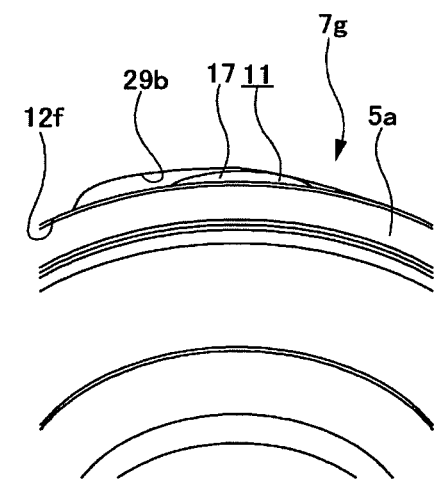
Figure 26A:
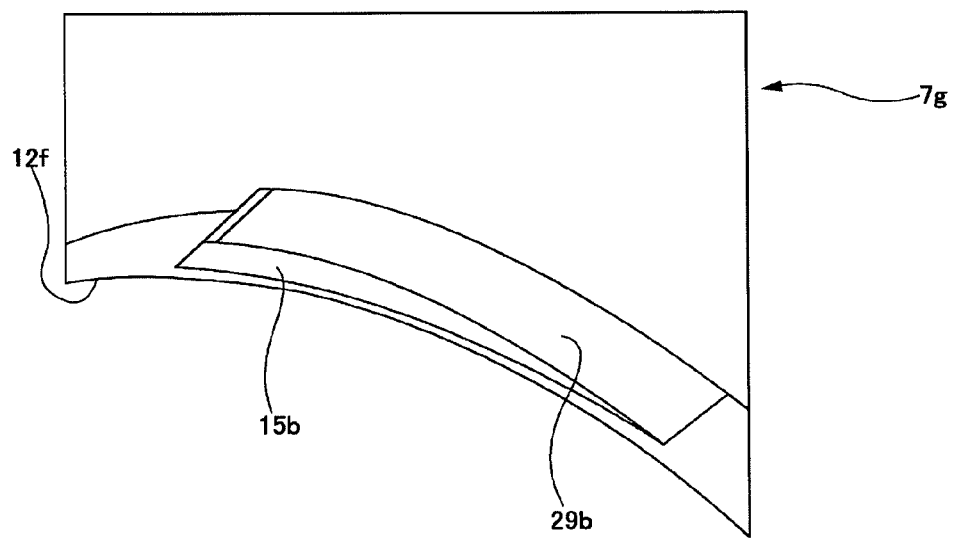
FIG. 26A is a sight-through perspective view showing a recess portion in the tenth embodiment.
Figure 26B:
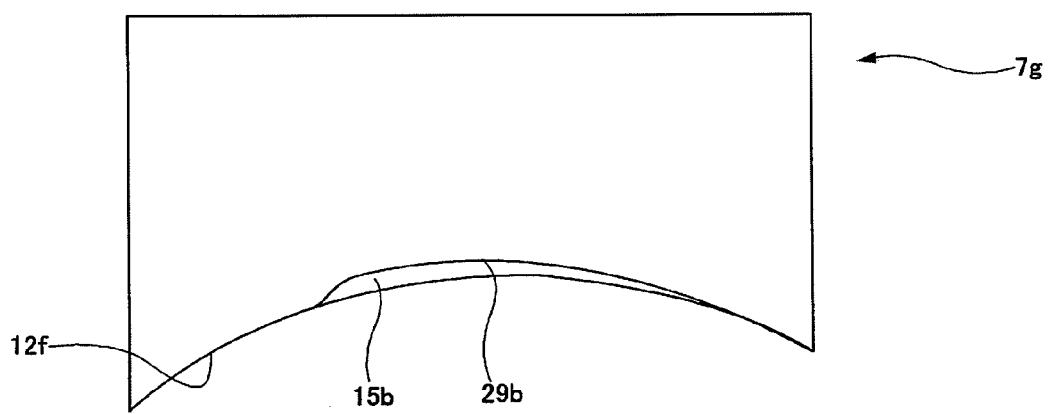
FIG. 26B is an orthographic projection view showing the recess portion in the tenth embodiment.

In this embodiment, the outer ring 5a and the retainer plate 7g are coupled together, and when the retainer plate 7g is rotated in the clockwise direction from a neutral condition shown in FIG. 25A, each larger-diameter retaining portion 17 of a retaining ring 11 is brought into engagement with the deeper portion of the recess portion 29b as shown in FIG. 25B. Then, the outer ring 5a having the retaining ring 11 mounted thereon is rotated together with the retainer plate 7g. On the other hand, when the outer ring 5a is rotated in the clockwise direction from the neutral condition, each larger-diameter retaining portion 17 of the retaining ring 11 is brought into biting engagement with the shallower portion of the recess portion 29b as shown in FIG. 25C, and bites in a wedge-like manner into a gap between a bottom surface of the recess portion 29b and a bottom surface of a retaining recessed groove formed in an outer circumferential surface of the outer ring 5a. Thus, the outer ring 5a is prevented from rotation relative to the retainer plate 7g.

The structure of this embodiment has the above construction and effects, and therefore even when the outer ring 5a is inwardly fitted in the holding recess 4 by a clearance fit or a loose interference fit which does not always provide a sufficient fitting strength, the outer ring 5a is prevented from rotation during the operation. In the structure of this embodiment, even when the outer ring 5a is thus inwardly fitted in the holding recess 4 by a clearance fit or a loose interference fit, creep of the outer ring 5a can be prevented. However, the outer ring 5a may be fitted in the holding recess 4 by a sufficiently tight interference fit. Even when the outer ring 5a is thus fitted by a strong interference fit, the retainer plate 7g can be rotated relative to the outer ring 5a in the clockwise direction (FIG. 25), and therefore through holes formed through this retainer plate 7g can be brought into alignment with respective screw holes formed in the housing. When the structure of this embodiment is used in combination with the above strong interference fit structure, creep of the outer ring 5a can be more positively prevented.

Eleventh Embodiment

Figure 27A:
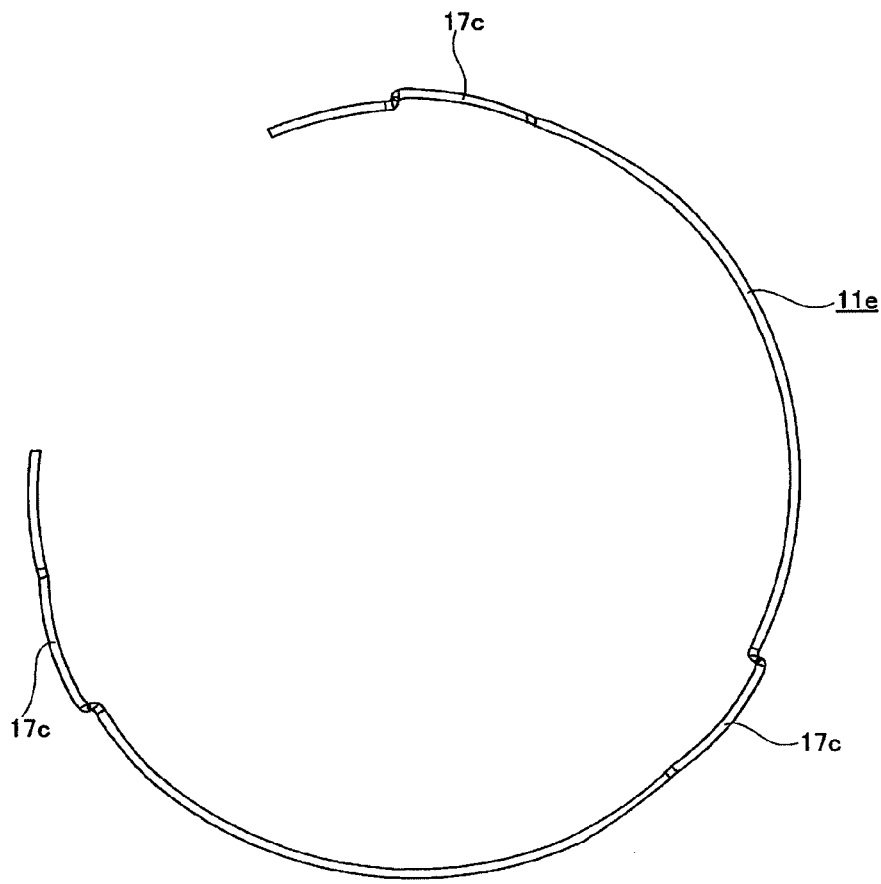
FIG. 27A is an orthographic; projection view of a retaining ring (as seen in an axial direction) used in an eleventh embodiment of the invention.
Figure 27B:
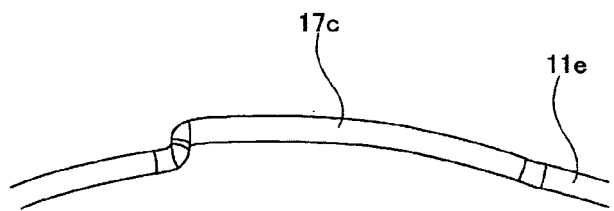
FIG. 27B is an enlarged view of a portion of the retaining ring of FIG. 27A.
Figure 28:
FIG. 28 is a fragmentary, perspective view showing a condition in which this retaining ring is mounted on an outer ring.
Figure 29A:
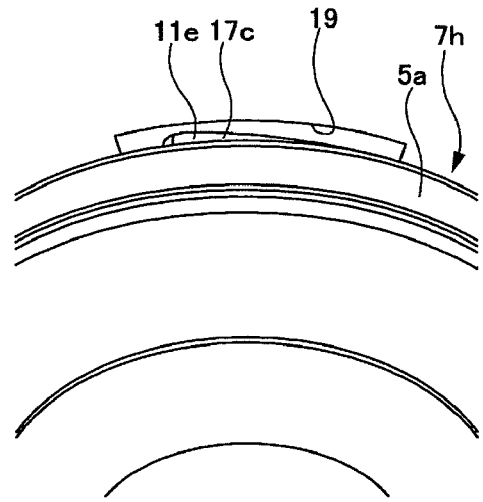
FIGS. 29A to 29C are views similar to FIGS. 21A to 21C, but showing the eleventh embodiment.
Figure 29B:
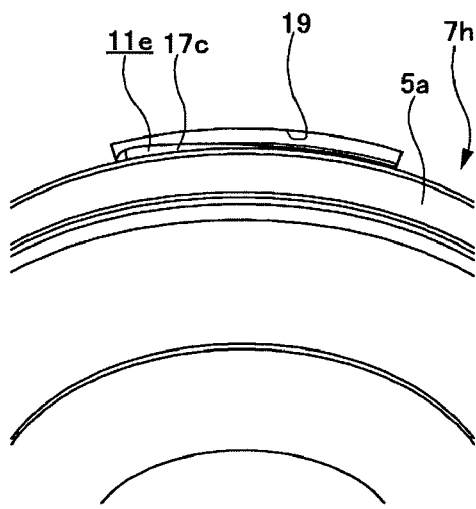
Figure 29C:
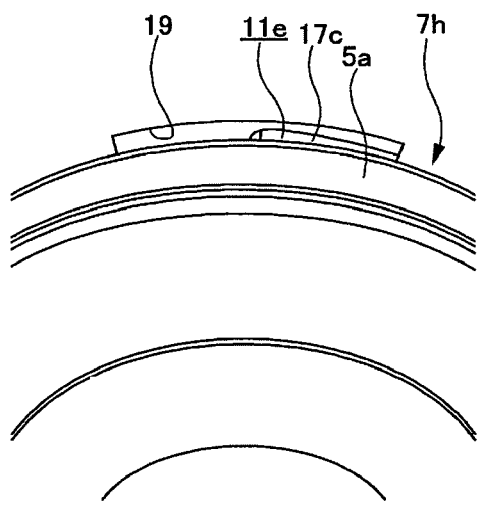

FIGS. 27 to 29 show an eleventh embodiment of the invention. In this embodiment, also, instead of fitting an outer ring 5a in the holding recess 4 of the housing 2 by a clearance fit or a loose interference fit, a structure for preventing a relative rotation of the outer ring 5a and a retainer plate 7h in a specified direction is provided between the outer ring 5a and the retainer plate 7h in order to prevent the rotation of the outer ring 5a during the operation as in the above tenth embodiment.

Namely, in this embodiment, an projection amount of each of larger-diameter retaining portions 17c formed respectively at a plurality of circumferentially-spaced portions of a retaining ring the is larger at its one circumferential end portion, and is smaller at the other circumferential end portion. At an assembling state of the rotation support unit, assembling direction is restricted so that a force acts on the outer ring 5a in a clockwise direction as shown in FIG. 29. In FIG. 29, the showing of a retaining projection 15 (see, for example, FIGS. 1 to 4) formed at an axial end portion of each larger-diameter portion (recess portion) 19 is omitted.

In this embodiment, when the retainer plate 7h is rotated in the clockwise direction from a neutral condition shown in FIG. 29A in which the outer ring 5a and the retainer plate 7h are coupled together, the end portion of each larger-diameter retaining portion 17c of the retaining ring 11e which projects in a larger amount is brought into engagement with one circumferential end of the larger-diameter portion 17c as shown in FIG. 29B. Then, the outer ring 5a having the retaining ring lie mounted thereon is rotated together with the retainer plate 7h. On the other hand, when the outer ring 5a is rotated in the clockwise direction from the neutral condition, each larger-diameter retaining portion 17c of the retaining ring 11e bites in a wedge-like manner into a gap between the other circumferential end of the larger-diameter portion 19 and a bottom surface of a retaining recessed groove formed in an outer circumferential surface of the outer ring 5a. Thus, the outer ring 5a is prevented from rotation relative to the retainer plate 7h.

The structure of this embodiment has the above construction and effects, and therefore even when the outer ring 5a is fitted in the holding recess 4 by a clearance fit or a loose interference fit, the outer ring 5a is prevented from rotation during the operation as is the case with the above tenth embodiment. In the structure of this embodiment, even when the outer ring 5a is thus fitted in the holding recess 4 by a clearance fit, creep of the outer ring 5a can be prevented. However, the outer ring 5 a may be outwardly fitted in the holding recess 4 by a tight interference fit. Even when the outer ring 5a is thus fitted by a tight interference fit, the retainer plate 7h can be rotated relative to the outer ring 5a in the clockwise direction in FIG. 29, and therefore through holes formed through this retainer plate 7h can be brought into alignment with respective screw holes formed in the housing. When the structure of this embodiment is used in combination with the above tight interference fit structure, creep of the outer ring 5a can be more positively prevented.

One important feature of the present invention resides in the fact that the retainer plate is connected to the outer ring of the rolling bearing in such a manner that this retainer plate can be rotated relative to the outer ring but can not be separated therefrom. The bearing used in the invention is not limited to the illustrated single row deep groove rolling bearing, but any other suitable rolling bearing can be used.

While the invention has been described in connection with the exemplary embodiments, it will be obvious to those skilled in the art that various changes and modifications may be made therein without departing from the present invention, and it is aimed, therefore, to cover in the appended claims all such changes and modifications as fall within the true spirit and scope of the present invention.

What is claimed is:

1. A rolling bearing unit for rotatably supporting a rotation shaft on a housing, comprising:
    a radial bearing including an outer ring the outer ring including:
        a larger-diameter outer circumferential surface formed on one axial end portion thereof;
        a smaller-diameter step portion formed at the other axial end portion thereof and having a retaining recessed groove formed therein and
        a step surface formed between the larger-diameter outer circumferential surface and the smaller diameter step portion;
    a retainer plate having a fitting hole formed through a central portion thereof, to which the smaller-diameter step portion is outwardly fitted, and a retaining projection formed on an inner circumferential surface of the fitting hole and
    a retaining ring of an interrupted ring-shape which is made of a resilient material, and includes a smaller-diameter portion received in the retaining recessed groove in the outer ring, and a larger-diameter retaining portion projecting radially outwardly from an outer circumferential surface of the smaller-diameter step portion of the outer ring;
    wherein the retainer plate is disposed between the step surface of the outer ring and the larger-diameter retaining portion of the retaining ring so as to rotate relative to the smaller-diameter step portion of the outer ring and so as to prevent the retainer plate from falling off therefrom to the other axial end side.

2. The rolling bearing unit according to claim 1, wherein
    a recess portion is formed at the other axial end side of the retaining projection of the retaining plate, and is recessed from the inner circumferential surface of the retainer plate; and
    the larger-diameter retaining portion of the retaining ring is received in the recess portion.

3. The rolling bearing unit according to claim 2, wherein
    the retainer plate has through holes or screw holes formed in at least three portions thereof spaced from one another in a circumferential direction,
    an outer diameter of those portions of the retainer plate having the respective through holes or screw holes is larger than those portions of the retainer plate where the through hole or screw hole is not formed,
    a number of the recess portions in the retainer plate is equal to a number of the through holes or screw holes and
    a circumferential position of each of the recess portions is located between a position at which a distance between the inner circumferential surface of the fitting hole and an outer circumferential edge of the retainer plate is the shortest and a portion where the through hole or screw hole is formed.

4. The rolling bearing unit according to claim 3, wherein
    when a distance between a bottom surface of the recess portion of the retainer plate and the inner circumferential surface of the retainer plate is defined as a depth,
    in the bottom surface of the recess portion of the retainer plate, the depth at one circumferential end portion is smaller than that at the other circumferential end portion.

5. The rolling bearing unit according to claim 3, wherein
    a projection amount of the larger-diameter retaining portion of the retaining ring at one circumferential end portion larger than that at the other circumferential end portion.

6. The rolling bearing unit according to claim 2, wherein
    an inner diameter of the inner circumferential surface of the retainer plate is larger than a diameter of the smaller-diameter step portion of the outer ring; and
    a plurality of the recess portions are formed in the inner circumferential surface of the retainer plate and are spaced from one another in a circumferential direction; and
    a plurality of the retaining projections of the retainer plate are provided at the one axial ends, respectively, and have inclined surface in which an inner diameter of an inner circumferential surface of the retaining projection gradually increases toward the one axial end side.

7. The rolling bearing unit according to claim 6, wherein
    the retainer plate has through holes or screw holes formed in at least three portions thereof spaced from one another in a circumferential direction,
    an outer diameter of those portions of the retainer plate having the respective through holes or screw holes is larger than those portions of the retainer plate where the through hole or screw hole is not formed,
    a number of the recess portions in the retainer plate is equal to a number of the through holes or screw holes and
    a circumferential position of each of the recess portions is located between a position at which a distance between the inner circumferential surface of the fitting hole and an outer circumferential edge of the retainer plate is the shortest and a portion where the through hole or screw hole is formed.

8. The rolling bearing unit according to claim 7, wherein
    the retaining projection is formed at one axial end of the inner circumferential surface of the retainer plate over the entire periphery thereof; and
    a support projection is formed at the other axial end of the inner circumferential surface of the retainer plate over the entire periphery thereof; and
    a outer-diameter retaining recessed groove which retains; the larger-diameter retaining portion of the retaining ring is formed between the retaining projection and the support projection; and
    the support projection of the retainer plate opposes to the other axial end portion of the smaller-diameter step portion of the outer ring.

9. The rolling bearing unit according to claim 7, wherein
    a cylindrical surface, which extends axially and of which inner diameter is constant, is formed on the other axial end side of the retainer plate relative to the inclined surface of the retainer plate and
    the cylindrical surface of the retainer plate opposes to the other end portion of the smaller-diameter step portion of the outer ring.

10. The rolling bearing unit according to claim 9, wherein
    a projection amount of the larger-diameter retaining portion of the retaining ring at one circumferential end portion larger than that at the other circumferential end portion.

11. The rolling bearing unit according to claim 6, wherein
    the inner circumferential surfaces of the recess portions of the retainer plate are concentric with the inner circumferential surface of the fitting hole, and are larger in diameter than the inner circumferential surface of the fitting hole.

12. The rolling bearing unit according to claim 6, wherein the inner surface of the recess portion of the retainer plate is a flat surface and the distance between a central portion of the flat surface of the recess portion and the retaining recessed groove of the outer ring is smaller than the distance between each of opposite end portions of the flat surface of the recess portion and the retaining recessed groove of the outer ring.

13. The rolling bearing unit according to claim 6, wherein when a distance between a bottom surface of the recess portion of the retainer plate and the inner circumferential surface of the retainer plate is defined as a depth, in the bottom surface of the recess portion of the retainer plate, the depth at one circumferential end portion is smaller than that at the other circumferential end portion.

14. The rolling bearing unit according to claim 6, wherein a projection amount of the larger-diameter retaining portion of the retaining ring at one circumferential end portion larger than that at the other circumferential end portion.

15. The rolling bearing unit according to claim 1, wherein the retaining projection is formed at one axial end of the inner circumferential surface of the retainer plate over the entire periphery thereof; and the retaining projection projects radially inwardly of the inner circumferential surface of the fitting hole.

16. The rolling bearing unit according to claim 15, wherein an inclined surface, of which inner diameter gradually increases toward the one axial end, is formed on one axial end portion of the inner circumferential surface of the retainer plate, a cylindrical surface, which extends axially and of which inner diameter is constant, is formed on the other axial end side of the retainer plate relative to the inclined surface of the retainer plate and the cylindrical surface of the retainer plate opposes to the other end portion of the smaller-diameter step portion of the outer ring.

17. The rolling bearing unit according to claim 16, wherein a projection amount of the larger-diameter retaining portion of the retaining ring at one circumferential end portion larger than that at the other circumferential end portion.

* * * * *